United States Patent [19]
Bell et al.

[11] Patent Number: 5,671,420
[45] Date of Patent: Sep. 23, 1997

[54] DISTRIBUTION DISKETTE UTILITY

[75] Inventors: David R. Bell, Rancho Santa Margarita; Thomas R. Ramsdell, Lomita; Marianne L. Kodimer, Anaheim, all of Calif.

[73] Assignee: Canon Information Systems, Inc., Costa Mesa, Calif.

[21] Appl. No.: 496,099

[22] Filed: Jun. 28, 1995

[51] Int. Cl.$^6$ .................................................. G06F 17/30
[52] U.S. Cl. ........................... 395/712; 395/619; 395/620
[58] Field of Search ............................. 395/600, 619, 395/620, 712

[56] References Cited

U.S. PATENT DOCUMENTS

| | | | |
|---|---|---|---|
| 4,558,413 | 12/1985 | Schmidt et al. | 364/300 |
| 5,047,918 | 9/1991 | Schwartz et al. | 364/200 |
| 5,058,162 | 10/1991 | Santon et al. | 380/25 |
| 5,226,163 | 7/1993 | Karsh et al. | 395/700 |
| 5,287,500 | 2/1994 | Stoppani | 395/600 |
| 5,327,563 | 7/1994 | Singh | 395/700 |
| 5,333,315 | 7/1994 | Saether et al. | 395/600 |
| 5,355,497 | 10/1994 | Cohen-Levy | 395/700 |
| 5,423,034 | 6/1995 | Cohen-Levy et al. | 395/600 |

OTHER PUBLICATIONS

Robert Cowart, "Mastering WINDOWS 3.1 Special Edition", SYBEX, pp. 101–145 1993.
Kenitec, "Microsoft Windows User's Guide", Kenitec, pp. 91–138 1992.
*Win 3.1 SDK: Setup Toolkit for Windows*, Microsoft Development Library, Microsoft Corporation, 1992–1995.
SHIELD Series, "Development Tools for Graphical Environments", *Developer's Guide and Reference Manual*, The Stirling Group®, no date.

*Primary Examiner*—Thomas G. Black
*Assistant Examiner*—Donald D. Min
*Attorney, Agent, or Firm*—Fitzpatrick, Cella, Harper & Scinto

[57] ABSTRACT

A method of distributing files onto a computer-usable storage medium based on a user's selection of at least one file from a file library comprising executable and nonexecutable files. The method includes a first displaying step for displaying (1) the file library and (2) at least one file storage designation area having a predetermined size which is representative of a computer-usable storage medium having the predetermined size. A second displaying step displays, in response to a user's input, which includes selection of at least one file in the file library, a file attribute option, which includes file installation options, and an assigning step assigns, in response to a user's selection of at least one file installation option, at least one file attribute to a selected file which corresponds to the at least one file installation option. A third displaying step displays the selected file in one file storage designation area in response to a user's dragging and dropping the selected file into the one of the file storage designation areas, and a storing step stores, in response to a distribution command, the selected file in the computer-usable storage medium, together with the at least one file attribute.

55 Claims, 29 Drawing Sheets

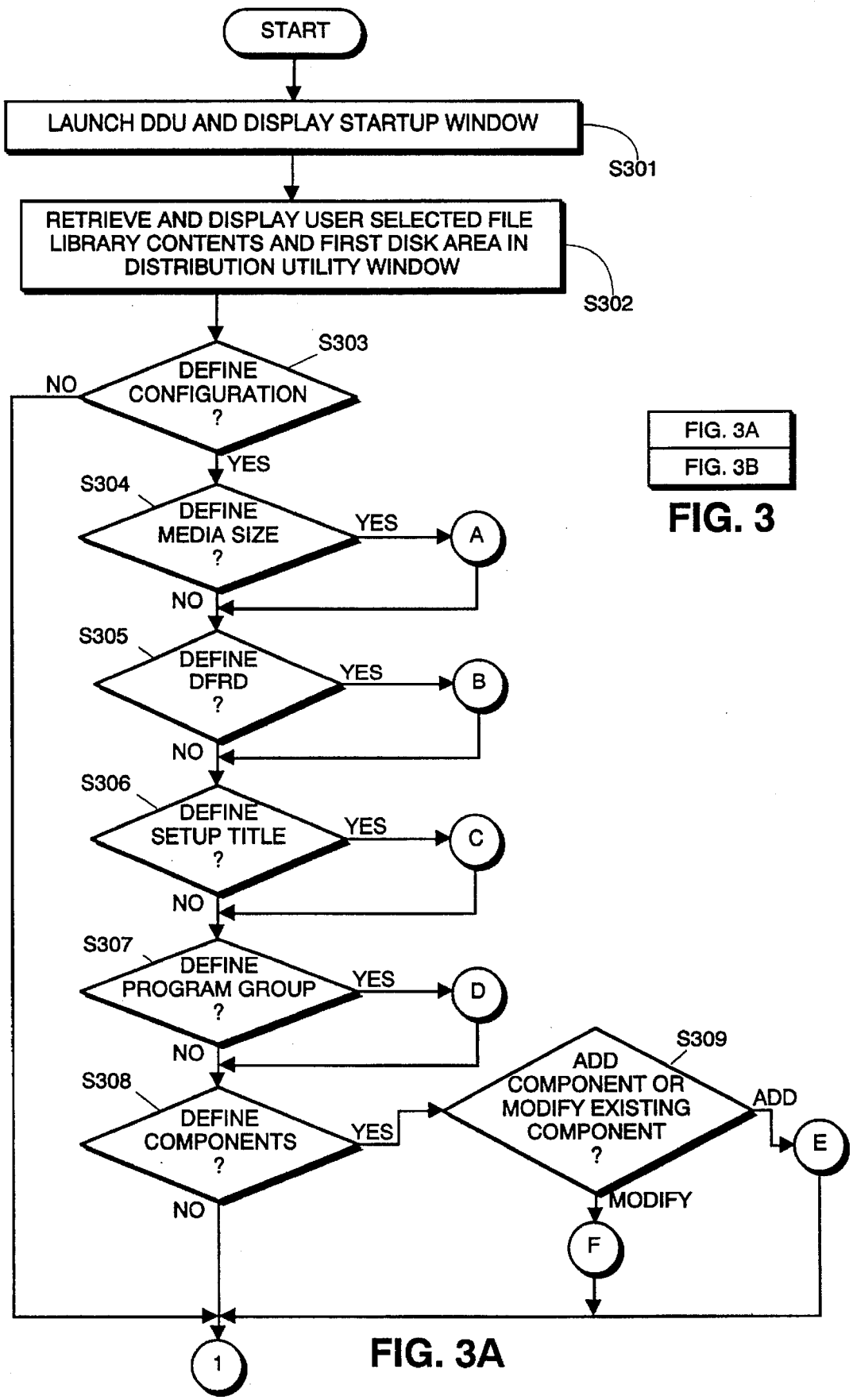

DISTRIBUTION DISKETTE UTILITY

BACKGROUND OF THE INVENTION

1. Field of the Invention

The present invention relates to a distribution diskette utility system in which files from a file library are selected, assigned file attributes and either (1) selectively assigned to a file storage designation area by a programmer, or (2) automatically assigned to file storage designation areas by the distribution diskette utility.

2. Description of the Related Art

Conventional distribution diskette utility systems do not provide a programmer with the freedom and flexibility to selectively control the distribution and assignment of files to distribution media, such as a floppy disk, a CD-ROM, etc. Rather, such systems automatically determine the number of distribution media on which a given number of files are to be arranged, and automatically arranges the files onto the distribution media.

Thus, conventional distribution diskette utility systems do not permit a programmer selective control over the assignment of files to distribution media, for example, by selecting files from a library and "dragging and dropping" those files into desired distribution media designation areas. Nor do conventional distribution diskette utility systems provide a programmer with control over the number of distribution media onto which those files are to be assigned.

Accordingly, there exists a need for a distribution diskette utility system which permits a programmer to selectively assign files for subsequent copying onto distribution media, and which permits a programmer to select a number of distribution media onto which the files are to be assigned.

Additionally, conventional diskette distribution systems do not provide a suggested assignment of files having assigned attributes to distribution media, which can be subsequently modified by the programmer. Rather, as indicated above, conventional distribution diskette systems simply assign files based on a predetermined distribution layout, without showing the distribution layout to the programmer prior to copying the files onto the distribution media. This can cause problems in the case that the programmer does not approve of the automatically-determined file layout.

Thus, there exists a need for a distribution diskette utility system which provides a programmer with a computer-implemented suggested file assignment to distribution media, and which permits a programmer to selectively modify the suggested assignment.

SUMMARY OF THE INVENTION

The present invention addresses the above-described need for selective control over the assignment of files onto distribution media by providing a system of distributing files onto distribution media, by which a programmer can "drag" selected files from a library of files and "drop" the selected files into a file storage designation area. In this manner, the present invention provides a programmer with the ability to selectively assign files to file storage designation areas in the way that the files are to be stored on distribution media.

According to one aspect, the present invention is a method of distributing files onto a computer-usable storage medium based on a user's selection of at least one file from a file library comprising executable and nonexecutable files. The method includes a first displaying step for displaying (1) the file library and (2) at least one file storage designation area having a predetermined size which is representative of a computer-usable storage medium having the predetermined size. A second displaying step displays, in response to a user's input, which includes selection of at least one file in the file library, a file attribute option, which includes file installation options, and an assigning step assigns, in response to a user's selection of at least one file installation option, at least one file attribute to a selected file which corresponds to the at least one file installation option. A third displaying step displays the selected file in one file storage designation area in response to a user's dragging and dropping the selected file into the file storage designation area, and a storing step stores, in response to a distribution command, the selected file in the computer-usable storage medium, together with the at least one file attribute.

In the foregoing method, the first displaying step can comprise automatically displaying a first file storage designation area, and displaying, in response to a programmer's input, additional file storage designation areas. Advantageously, this feature permits a programmer to selectively add and delete additional file storage designation areas from a workspace used in the present invention.

According to another aspect, the present invention is a system for distributing files onto a computer-usable storage medium based on a user's selection of at least one file from a file library comprising executable and nonexecutable files. The system includes input means for inputting user selections and processing commands, memory means for storing the file library, a file distribution application, and process steps, and processing means. Processing means processes, in response to a processing command, the stored process steps so as to execute the file distribution application. Upon executing the file distribution application, the processing means performs (1) a first displaying step for displaying the file library and at least one file storage designation area having a predetermined size which is representative of a computer-usable storage medium having the predetermined size; (2) a second displaying step for displaying, in response to a user's input, which includes selection of at least one file in the file library, a file attribute option, which includes file installation options; (3) an assigning step for assigning, in response to a user's selection of at least one file installation option, at least one file attribute to a selected file which corresponds to the at least one file installation option; (4) a third displaying step for displaying the selected file in one file storage designation area in response to a user's dragging and dropping the selected file into the file storage designation area; and (5) a storing step for storing, in response to a distribution command, the selected file in the computer-usable storage medium, together with the at least one file attribute.

According to still another aspect, the present invention is a method of distributing files having assigned attributes onto computer-usable storage media based on a suggested file distribution assignment of the files having assigned attributes to file storage designation areas. The method includes a first displaying step for displaying (1) a file library comprising executable and nonexecutable files and (2) at least one file storage designation area corresponding to a fixed storage area in a memory means, and a second displaying step for displaying, in response to a user's input, which includes selection of at least one file in the file library, a file attribute option, which includes file installation options. An assigning step assigns, in response to a user's selection of at least one file installation option, at least one file attribute to a selected file which corresponds to the at least one file installation option. A third displaying step displays, in response to a user's input, a suggested file distribution assignment of the selected file to one file storage designation area, and a storing step stores, in response to a user's input, the selected file in the fixed storage area.

By virtue of the foregoing, the programmer is provided with a suggested file assignment of files having assigned attributes onto computer-usable storage media. Advantageously, the programmer can modify the file assignment, or, as described above, store the file assignment.

According to still another aspect, the present invention is a system for distributing files having assigned attributes onto computer-usable storage media based on a suggested file distribution assignment of the files having assigned attributes to file storage designation areas. The system includes input means for inputting user selections and processing commands, memory means for storing a file library comprising executable and nonexecutable files, a file distribution application, and process steps, and processing means. The processing means processes, in response to a processing command, the stored process steps so as to execute the file distribution application. Upon executing the file distribution application, the processing means performs (1) a first displaying step for displaying a file library comprising executable and nonexecutable files and at least one file storage designation area corresponding to a fixed storage area in a memory means; (2) a second displaying step for displaying, in response to a user's input, which includes selection of at least one file in the file library, a file attribute option, which includes file installation options; (3) an assigning step for assigning, in response to a user's selection of at least one file installation option, at least one file attribute to a selected file which corresponds to the at least one file installation option; (4) a third displaying step for displaying, in response to a user's input, a suggested file distribution assignment of the selected file to one file storage designation area; and (5) a storing step for storing, in response to a user's input, the selected file in the fixed storage area.

According to still another aspect, the present invention is computer-executable process steps stored on a computer-readable medium. The process steps distribute files onto a computer-usable storage medium based on a user's selection of at least one file from a file library comprising executable and nonexecutable files. The process steps include a first displaying step which displays (1) the file library and (2) at least one file storage designation area having a predetermined size which is representative of a computer-usable storage medium having the predetermined size, and a second displaying step which displays, in response to a user's input, which includes selection of at least one file in the file library, a file attribute option, which includes file installation options. An assigning step assigns, in response to a user's selection of at least one file installation option, at least one file attribute to a selected file which corresponds to the at least one file installation option. A third displaying step displays the selected file in one file storage designation area in response to a user's dragging and dropping the selected file into the one file storage designation area. A storing step stores, in response to a distribution command, the selected file in the computer-usable storage medium, together with the at least one file attribute.

According to still another aspect, the present invention is computer-executable process steps stored on a computer-readable medium. The process steps distribute files having assigned attributes onto computer-usable storage media based on a suggested file distribution assignment of the files having assigned attributes to file storage designation areas. The process steps include a first displaying step which displays (1) a file library comprising executable and nonexecutable files and (2) at least one file storage designation area corresponding to a fixed storage area in a memory means, and a second displaying step which displays, in response to a user's input, which includes selection of at least one file in the file library, a file attribute option, which includes file installation options. An assigning step assigns, in response to a user's selection of at least one file installation option, at least one file attribute to a selected file which corresponds to the at least one file installation option. A third displaying step displays, in response to a user's input, a suggested file distribution assignment of the selected file to one file storage designation area. A storing step stores, in response to a user's input, the selected file in the fixed storage area.

According to still another aspect, the present invention is a computer program product which includes a computer-usable medium having a computer-readable program code means embodied in the computer-usable medium for causing a file distribution application to be launched within an operating windowing application. The computer-usable medium includes a computer-readable program code means for causing a computer to launch the file distribution application upon an input execution command, and a computer-readable program code means. The computer-readable program code means causes a computer to execute the file distribution application so as to distribute files onto a computer-usable storage medium based on a user's selection of at least one file from a file library comprising executable and nonexecutable files, upon execution of: (1) a first displaying step for displaying the file library and at least one file storage designation area having a predetermined size which is representative of a computer-usable storage medium having the predetermined size; (2) a second displaying step for displaying, in response to a user's input, which includes selection of at least one file in the file library, a file attribute option, which includes file installation options; (3) an assigning step for assigning, in response to a user's selection of at least one file installation option, at least one file attribute to a selected file which corresponds to the at least one file installation option; (4) a third displaying step for displaying the selected file in one file storage designation area in response to a user's dragging and dropping the selected file into the one file storage designation area; and (5) a storing step for storing, in response to a distribution command, the selected file in the computer-usable storage medium, together with the at least one file attribute.

According to still another aspect, the present invention is a computer program product which includes a computer-usable medium having a computer-readable program code means embodied in the computer-usable medium for causing a file distribution application to be launched within an operating windowing application. The computer-usable medium includes a computer-readable program code means for causing a computer to launch the file distribution application upon an input execution command, and a computer-readable program code means. The computer-readable program code means causes a computer to execute the file distribution application so as to distribute files having assigned attributes onto computer-usable storage media based on a suggested file distribution assignment of the files having assigned attributes to file storage designation areas, upon execution of: (1) a first displaying step for displaying a file library comprising executable and nonexecutable files and at least one file storage designation area corresponding to a fixed storage area in a memory means; (2) a second displaying step for displaying, in response to a user's input, which includes selection of at least one file in the file library, a file attribute option, which includes file installation options; (3) an assigning step for assigning, in response to a user's selection of at least one file installation option, at least one file attribute to a selected file which corresponds to the at least one file installation option; (4) a third displaying step for displaying, in response to a user's input, a suggested file distribution assignment of the selected file to one file storage designation area; and (5) a storing step for storing, in response to a user's input, the selected file in the fixed storage area.

According to still another aspect, the present invention is an apparatus which distributes files onto a computer-usable storage medium based on a user's selection of at least one file from a file library comprising executable and nonexecutable files. The apparatus includes a pointing device which inputs user selections and processing commands; a memory which stores the file library, a file distribution application, and process steps; and a processor which processes, in response to a processing command, the stored process steps so as to execute the file distribution application. Upon executing the file distribution application, the processor performs (1) a first displaying step for displaying the file library and at least one file storage designation area having a predetermined size which is representative of a computer-usable storage medium having the predetermined size; (2) a second displaying step for displaying, in response to a user's input, which includes selection of at least one file in the file library, a file attribute option, which includes file installation options; (3) an assigning step for assigning, in response to a user's selection of at least one file installation option, at least one file attribute to a selected file which corresponds to the at least one file installation option; (4) a third displaying step for displaying the selected file in one file storage designation area in response to a user's dragging and dropping the selected file into the one file storage designation area; and (5) a storing step for storing, in response to a distribution command, the selected file in the computer-usable storage medium, together with the at least one file attribute.

According to still another aspect, the present invention is an apparatus which distributes files having assigned attributes onto computer-usable storage media based on a suggested file distribution assignment of the files having assigned attributes to file storage designation areas. The apparatus includes a pointing device which inputs user selections and processing commands; a memory which stores a file library comprising executable and nonexecutable files, a file distribution application, and process steps; and a processor which processes, in response to a processing command, the stored process steps so as to execute the file distribution application. Upon executing the file distribution application, the processor performs (1) a first displaying step for displaying a file library comprising executable and nonexecutable files and at least one file storage designation area corresponding to a fixed storage area in the memory; (2) a second displaying step for displaying, in response to a user's input, which includes selection of at least one file in the file library, a file attribute option, which includes file installation options; (3) an assigning step for assigning, in response to a user's selection of at least one file installation option, at least one file attribute to a selected file which corresponds to the at least one file installation option; (4) a third displaying step for displaying, in response to a user's input, a suggested file distribution assignment of the selected file to one file storage designation area, and (5) a storing step for storing, in response to a user's input, the selected file in the fixed storage area.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
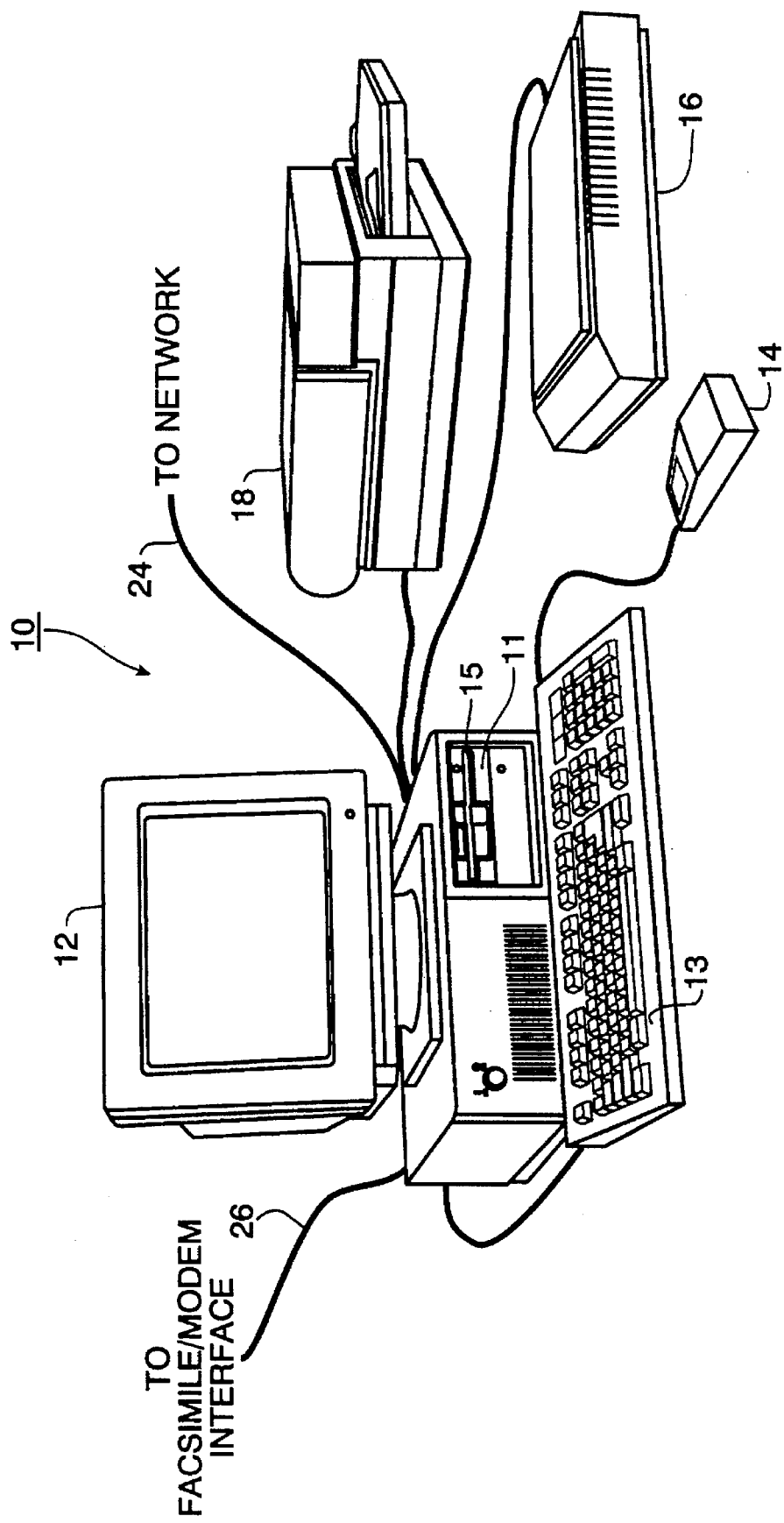
FIG. 1 shows a perspective view of computer hardware used in an operation of the distribution diskette utility system of the present invention.

FIG. 1 is a view showing the outward appearance of a representative embodiment of the present invention. Shown in FIG. 1 is computing equipment 10, such as a Macintosh or an IBM PC-compatible computer having a windowing environment, such as Microsoft® Windows. Provided with computing equipment 10 is display screen 12, such as a color monitor, keyboard 13 for entering text data and programmer commands, and pointing device 14, such as a mouse, for pointing and for manipulating objects displayed on display screen 12.

Computing equipment 10 includes a mass storage device such as computer disk 11 for storing distribution diskette utility 5 (hereinafter "DDU") of the present invention, DOS® operating system, a windowing operating system, such as Microsoft Windows®, SETUP program 6, file library 37 containing both executable and nonexecutable files such as data files and DLLs, and application programs, which contain stored program instructions by which computing equipment 10 manipulates and stores data files on disk 11 and presents data in those files to an operator via display screen 12.

Computer equipment 10 also includes floppy disk drive interface 15, into which floppy disks can be inserted. Information from such floppy disks can be downloaded to computer disk 11. Such information can include data files and application programs, such as DDU 5. Computer equipment 10 can also include a CD-ROM interface (not shown), from which information can also be downloaded to disk 11.

Image data is input by scanner 16 which scans documents or other images and provides bit map images of those documents to computing equipment 10. Data may also be input into computing equipment 10 from a variety of other sources such as network interface 24 or from other external devices via facsimile/modem interface 26.

It should be understood that, although a programmable general-purpose computer arrangement is shown in FIG. 1, a dedicated or stand-alone computer or other type of data processing equipment can be used in the practice of the present invention.

Figure 2:
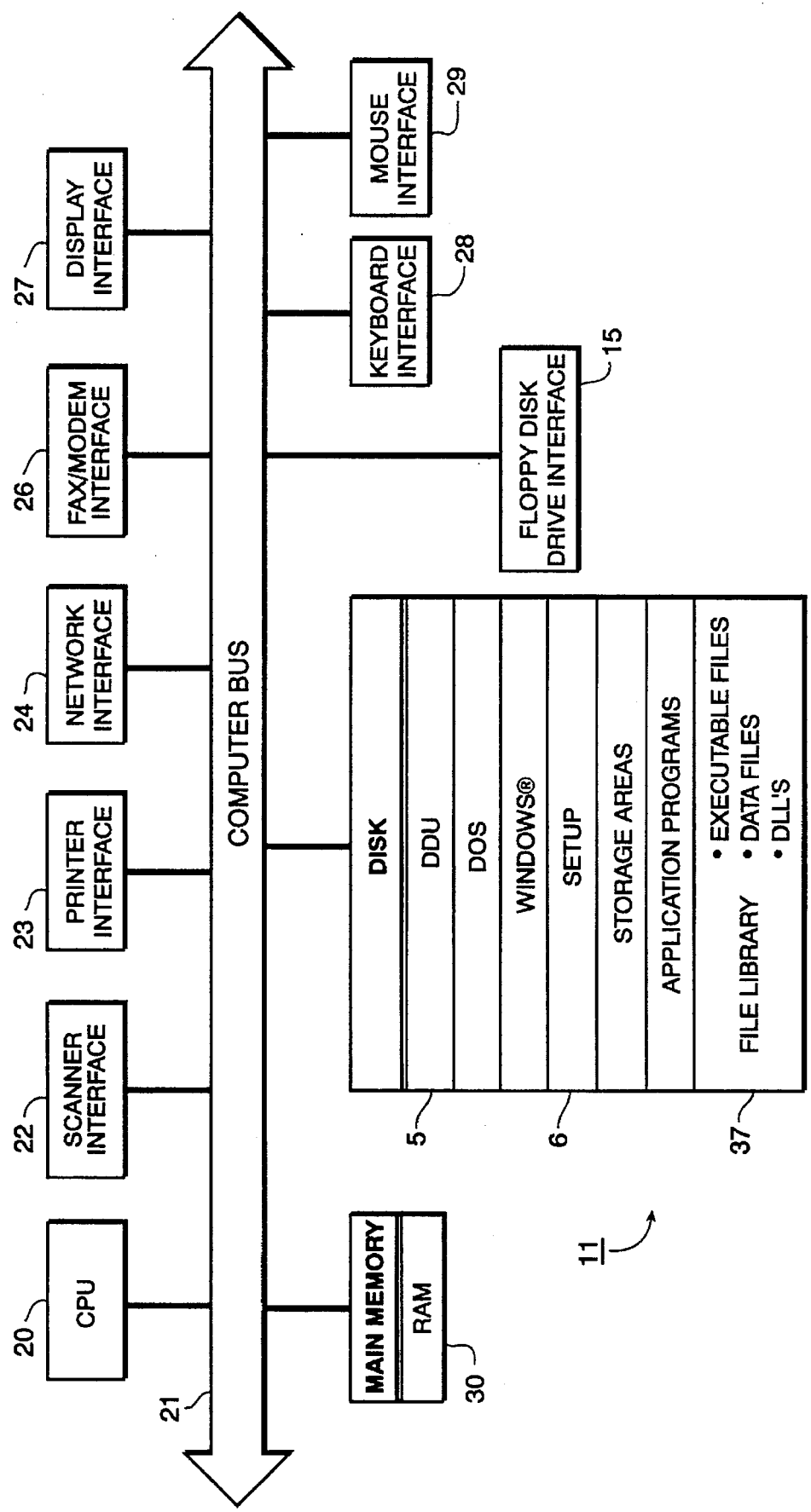
FIG. 2 shows a block diagram of the distribution diskette utility system depicted in FIG. 1.

FIG. 2 is a detailed block diagram showing the internal construction of computing equipment 10. As shown in FIG. 2, computing equipment 10 includes a central processing unit (hereinafter "CPU") 20 interfaced with computer bus 21. Also interfaced with computer bus 21 is scanner interface 22, network interface 24, fax/modem interface 26, display interface 27, keyboard interface 28, mouse interface 29, main memory 30, disk 11 and floppy disk drive interface 15.

Main memory 30 interfaces with computer bus 21 so as to provide random access memory storage for use by CPU 20 when executing stored program instructions such as Microsoft Windows®, DDU 5, SETUP program 6, and other application programs. More specifically, CPU 20 loads those programs from disk 11, or alternatively, from a floppy disk in floppy disk drive interface 15, into main memory 30 and executes those stored programs out of main memory 30.

SETUP program 6 is a program which is run by an end-user from distribution media, such as a floppy disk, onto which files distributed by DDU 5 are copied. SETUP program 6 is used to install these files onto the end-user's system and to display bitmap images while SETUP program 6 is running.

DDU 5, as described in more detail below, is a graphical-user interactive application which is used to distribute files onto distribution media. DDU 5 functions in a windowing environment. Therefore, in a non-windowing operating system, such as DOS®, windowing software must be executed prior to launching DDU 5. This windowing software is stored on disk 11, and is executed by CPU 20 out of main memory 30. In the preferred embodiment of the present invention, this windowing software is Microsoft Windows®.

Figure 3B:
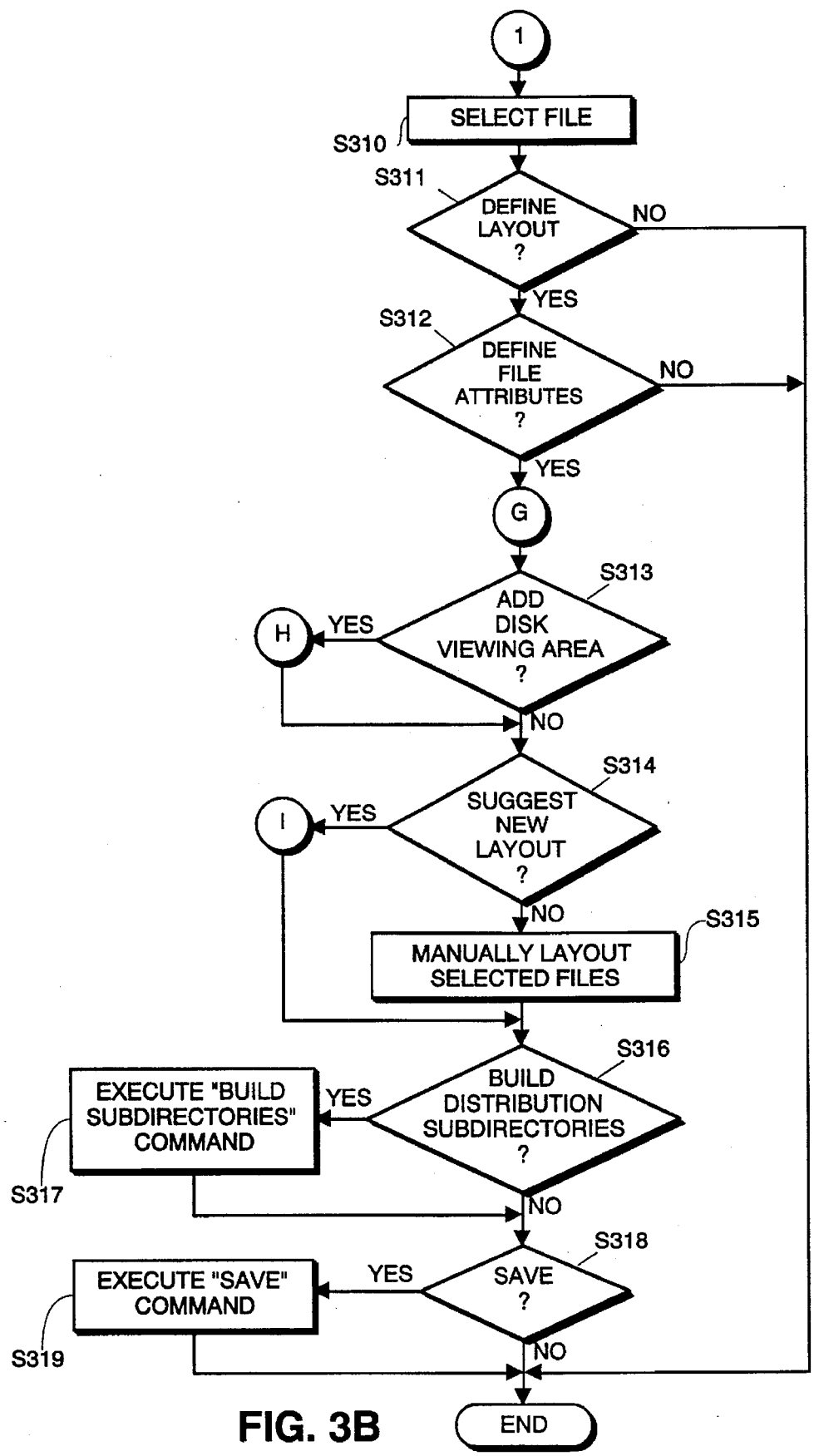
FIG. 3, comprised of FIGS. 3A and 3B, is a flow diagram showing operation of the present distribution diskette utility system

FIG. 3 shows a flow diagram of a preferred embodiment of DDU 5. The process steps shown in FIG. 3 are stored on disk 11, or on a file server (not shown), and are executed by CPU 20 out of main memory 30.

In step S301, a programmer launches DDU 5 from a windowing environment in a conventional manner. Upon startup, DDU 5 presents a programmer with startup window 31, shown in FIG. 4. Startup window 31 contains menu bar 32 having three menu options. These menu options are "File" menu option 130, "Config" menu option 131, and "Layout" menu option 132.

[Beginning A DDU Session]

In order to begin file distribution using DDU 5, the programmer must begin a DDU session. To accomplish this, in step S302, the programmer clicks on File menu option 130. Upon clicking on File menu option 130, pull-down menu 148 is displayed.

Pull-down menu 148 includes (1) "New" option 135, which a programmer can select to begin a new DDU session, (2) "Open" option 136, which a programmer can select to open a previously-saved DDU session, (3) "Close" option 161, which a programmer can select to close startup window 31, (4) "Save" option 150, which a programmer can select to save the results of a current DDU session, (5) "Save As" option 118, which a programmer can select to save the results of a current DDU session under a specified filename, (6) "Recent File" option 162, which a programmer can select to open a recently worked-on DDU file and (7) "Exit" option 149, which a programmer can select to exit the current DDU session. From the startup window, Save option 150 and Save As option 118 will not be available.

By selecting either New option 135 or Open option 136, a programmer can begin a DDU session. By selecting New option 135, the programmer can designate a new library of files to be distributed, from which DDU 5 creates a new product file. A product file is a file generated by DDU 5 to store all information from a particular DDU session. By selecting Open option 136, a programmer opens an existing product file, in which a library of files to be distributed has been previously designated. Beginning a DDU session by selecting Open option 136 will be discussed first, followed by beginning a DDU session by selecting New option 135.

Figure 6:
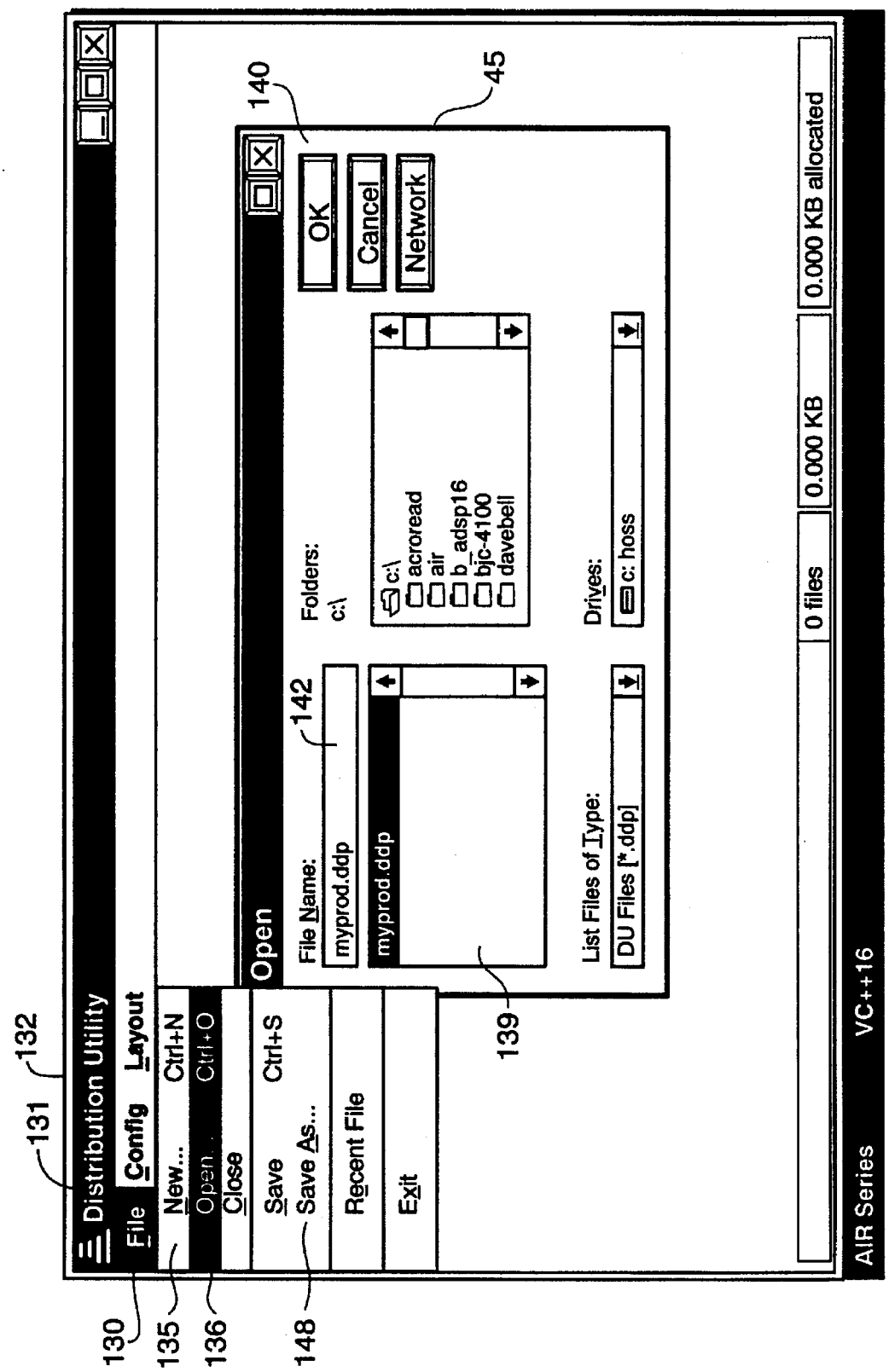
FIG. 6 shows a dialog box used to open an existing product file.

Open option 136 permits a programmer to direct DDU 5 to open an existing product file, and thereafter, to modify the results of a previously-saved DDU session. To select open option 136, the programmer clicks on File menu option 130 to display pull down screen 148, and then clicks on Open option 136 in pull-down menu 148. In response, DDU 5 displays open dialog box 45, shown in FIG. 6. The programmer can then select an existing product file from open list box 139 by clicking on a displayed product file.

Once the programmer selects an existing product file, e.g., "myprod.ddp", the name of the selected product file appears on file name line 142. The programmer can confirm the selection by clicking on OK button 140, or the programmer can modify the selection.

Figure 4:
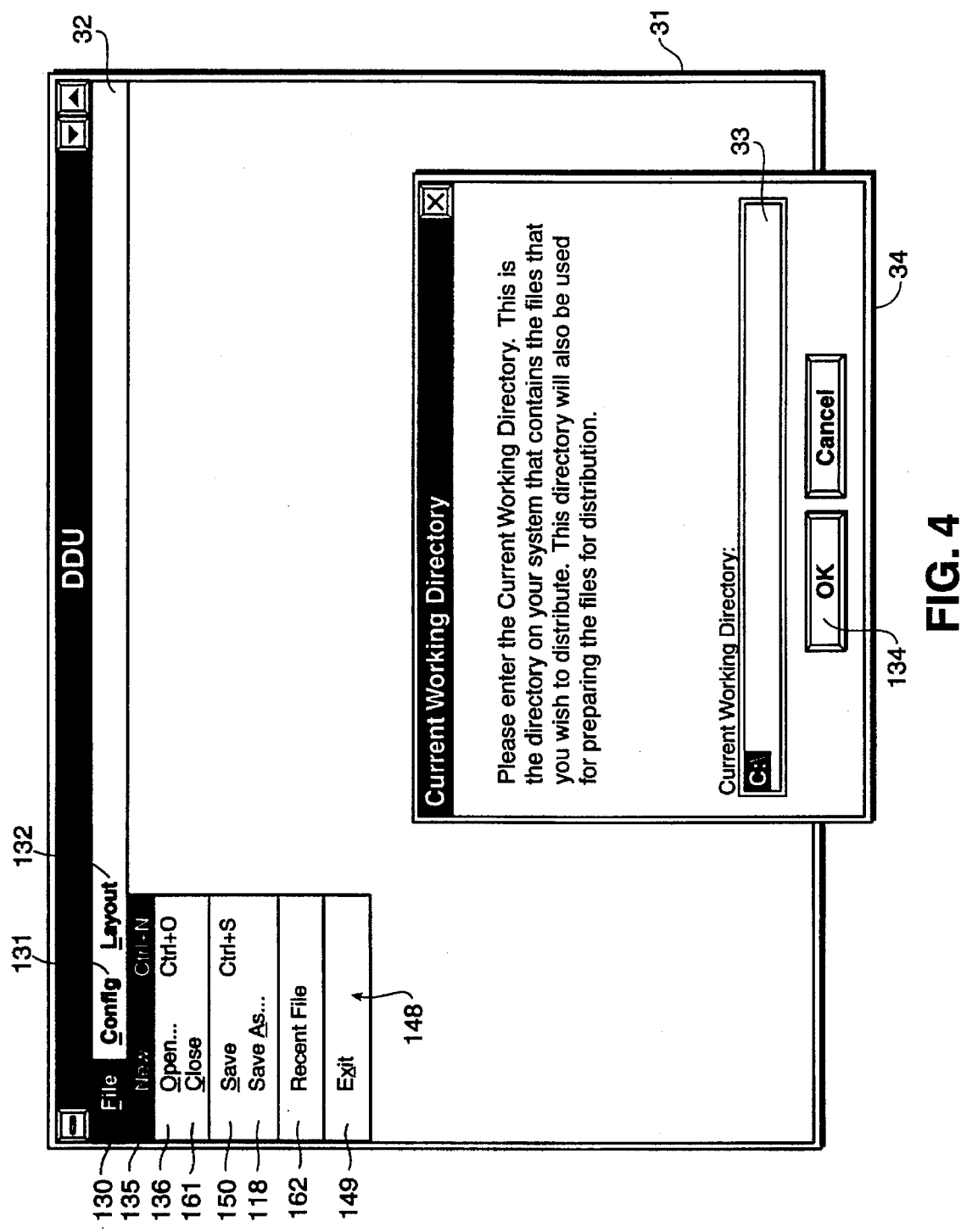
FIG. 4 shows setup windows for the present distribution diskette utility system.

If the programmer modifies and confirms the selection in file name line 142, and the modified selection defines a nonexistent product file, DDU 5 will issue an error message, and prompt the programmer to create a new product file by displaying current working directory dialog box 34, shown in FIG. 4. The working directory is the directory from which DDU 5 accesses information to be distributed in a DDU session.

If, however, the programmer merely confirms the selection, DDU 5 searches existing directories for the product file. When DDU 5 finds the product file, DDU 5 reads the working directory specified in the product file. DDU 5 then searches for the working directory specified in the product file. If DDU 5 cannot find the working directory specified in the product file, DDU 5 issues an error message. If DDU 5 finds the working directory specified in the product file, an appropriate DDU workspace is generated based on information in the product file, and executable and nonexecutable files are read into the DDU workspace from the current working directory.

If the sizes of the executable and nonexecutable files in the working directory specified in the product file have been revised or changed since the product file was created, the DDU workspace is updated with the new sizes of the files.

DDU 5 places any new files found in the current working directory that were not listed in the product file in a library, and marks them with an "X" to indicate that they are unassigned. Along these lines, DDU 5 issues an error message when DDU 5 determines that files which are listed in the product file cannot be found in the working directory specified in the product file.

It is noted that, if the programmer selects Open option 136, and a product file is currently open that has not been saved since its last modification, the programmer is prompted to save the current product file before a new file is opened. If the current product file has been saved since its last modification, the current product file is closed and the product file specified to be opened is opened.

The foregoing describes beginning a DDU session from startup window 31 by selecting Open option 136. As indicated above, however, a DDU session can also be begun from startup window 31 by selecting New option 135. The following describes beginning a DDU session by selecting New option 135.

Upon selecting New option 135 from pull-down menu 148, DDU 5 displays current working directory dialog box 34, which includes current working directory command line 33, onto which a programmer enters the name of a working directory that contains files that the programmer wishes to distribute with DDU 5.

Once the programmer enters the name of a working directory on current working directory command line 33 and confirms the entry by hitting OK button 134, DDU 5 generates a new DDU product file.

Next, DDU 5 runs a DDU initialization subroutine which initializes the newly-created product file with DDU configuration default values. Specifically, the DDU initialization subroutine sets default values for distribution media size, which is the size of the distribution media onto which files are to be distributed by DDU 5; data file root directory (hereinafter "DFRD"), which is an end user's directory onto which files distributed by DDU 5 are to be installed; and setup title, which is the title displayed when SETUP program 6 installs files distributed by DDU 5 onto an end user's system.

DDU 5 then generates a DDU workspace from the product file. The DDU workspace includes both a library and a first file storage designation area containing setup files comprising SETUP program 6. DDU 5 copies names and file sizes of executable and nonexecutable files from files in the entered working directory to the library, and marks these files with an "X" to indicate that they have not been assigned any file attributes. This feature of DDU 5 is discussed in detail below.

Figure 5:
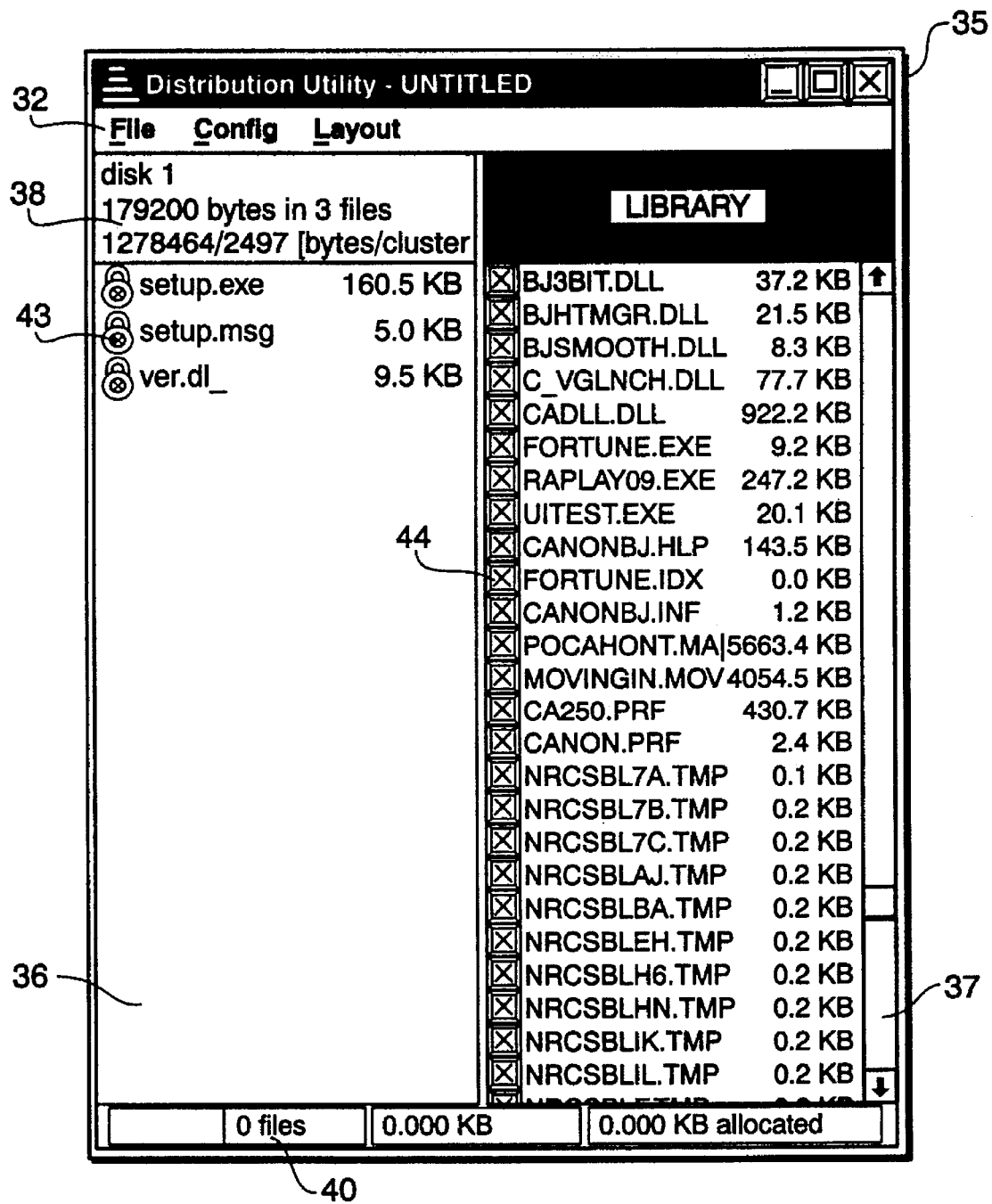
FIG. 5 shows an initial workspace generated by the present distribution diskette utility system.

FIG. 5 shows distribution utility window 35, which is an example of a DDU workspace. Distribution utility window 35 includes a first file storage designation area (disk1 36) and library 37. Disk1 36 and library 37 are list boxes, each of which is enclosed in a splitter window within distribution utility window 35. This splitter window permits a user to selectively modify the display area sizes of disk1 36 and library 37.

Disk1 36 is a representation of a computer-usable storage medium onto which files listed in disk1 36 are to be copied. Since disk1 36 is a mere representation of a distribution medium, files listed on disk1 36 (and on any other file storage designation areas) are not actually stored in disk1 36. Rather, only information relating to those files, such as file name and file size, is stored in disk1 36. As described below, files from library 37 can be "dragged and dropped" into disk1 36 or into any other file storage designation area once each file has been assigned file attributes.

When actual files listed on disk1 36 are to be distributed into subdirectories created by DDU 5, from which the actual files are copied onto distribution media, DDU 5 uses the information on the files listed in disk1 36 (e.g., file name and file attributes) to copy the actual files from the working directory to the subdirectories. This process is discussed in more detail below.

As shown in FIG. 5, disk1 36 includes three setup files, "setup.exe", "setup.msg" and "ver.dl_", which comprise SETUP program 6 DDU 5 automatically lists these setup files on disk1 36, and locks them there, as indicated, for example, by locking icon 43. This feature has been designed into DDU 5 since SETUP program 6 must be the first file to be executed when the distribution media is inserted into the end-user's system.

When a file is locked in a disk area, as in the case of "setup.exe", "setup.msg" and "ver.dl_", the file cannot be moved from that disk area. Locking of files is described in more detail below.

Information on the three setup files, as well as information on any other files listed on disk1 36, is shown on disk1 file information screen 38. Included in this information is the number of bytes comprising the files listed on disk1 36, and the number of bytes and corresponding number of clusters remaining on disk1 36.

File library 37 includes executable and nonexecutable files which can be selected and moved to disk1 36 via "dragging and dropping" the selected files from library 37 to disk1 36, as discussed in more detail below. These files can include DLLs, software programs, bitmap images, and the like.

As described in more detail below, before moving a file from file library 37 to disk1 36, the file must be selected and assigned at least one file attribute. Library data line 40 displays information relating to selected files in file library 37. Specifically, this information includes the number of files selected, the exact number of kilobytes in those files, and the number of kilobytes allocated, i.e., the number of kilobytes the selected files will take up in disk1 36. It is noted that, since no files are selected in FIG. 5, all of this information reads "0".

As shown in FIG. 5, each file in file library 37 includes a corresponding indicator icon, such as indicator icon 44. The presence of indicator icon 44 indicates that no attributes have been assigned to the file. As discussed in more detail below, in the case that a file attribute is assigned to a file, no indicator icon appears next to the file.

[Configuration Of DDU]

Reverting back to FIG. 3, in step S303, once distribution utility window 35 has been displayed, in step S303 the programmer can define general configuration settings for DDU 5. For example, the programmer can define distribution media size, setup title, DFRD, icons for files installed by SETUP 6 on an end user's system and components, which are DDU groupings of individual files, based on which DDU 5 can distribute files.

In the case that general configuration settings for DDU 5 are not reset, default values, which are set by the DDU initialization subroutine when distribution utility window 35 is generated, remain set, and processing proceeds to step S309.

Figure 8:
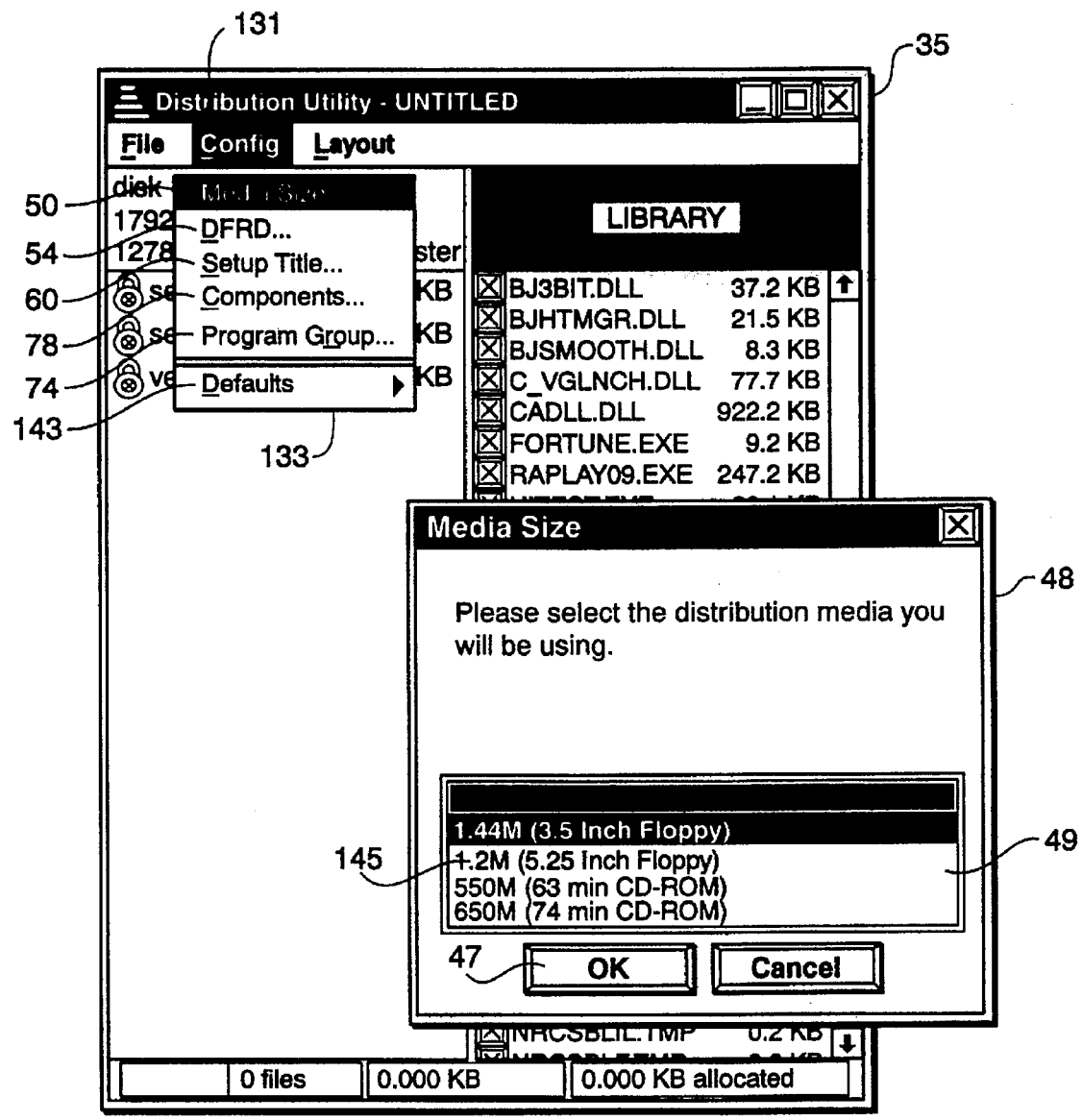
FIG. 8 shows a dialog box used to define distribution media size.

In the case that new configurations are to be set for DDU 5, the programmer clicks on Config menu option 131, shown in FIG. 8. Upon clicking on Config menu option 131, pull-down menu 133 is displayed.

Pull-down menu 133 includes (1) "Media Size" option 50, which a programmer can select to change the distribution media size of file storage designation areas in distribution utility window 35, (2) "DFRD" option 54, which a programmer can select to specify a new DFRD, (3) "Setup Title" option 60, which a programmer can select to change setup title characteristics for a setup title displayed by SETUP program 6, (4) "Program Group" option 74, which a programmer can select to define an icon in the Windows'® Program Manager for DDU-distributed files installed by SETUP program 6, (5) "Components" option 78, which a programmer can select to add or modify DDU components, and (6) "Defaults" option 143, which a programmer can select, prior to generating a new DDU workspace, in order to change default values for distribution media size, setup title and DFRD. Each of these selections is described in more detail below.

It is noted that configuration settings for DDU 5 will automatically be assigned to all file storage designation areas that are subsequently added to distribution utility window 35. Addition of other file storage designation areas is discussed in more detail below.

Figure 7:
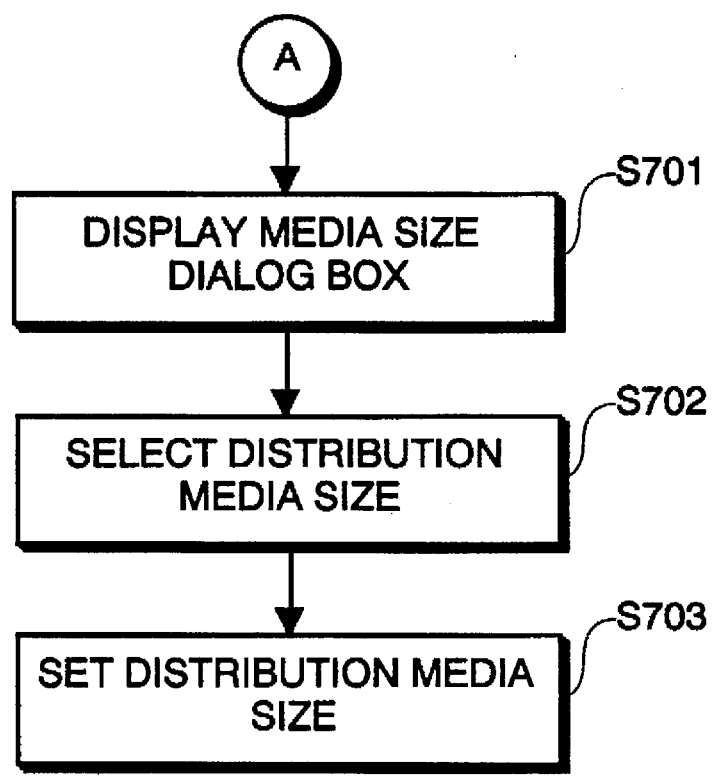
FIG. 7 is a flow diagram showing process steps for defining distribution media size.

In the case that new configurations for DDU 5 are to be set, processing then proceeds to step S304, where the programmer can direct DDU 5 to alter the currently-specified distribution media size of disk1 36, as well as that of any subsequently added file designation storage areas, e.g., disk1, disk2, disk3, etc. As indicated above, disk1 36 represents a distribution medium onto which files listed on disk1 36 are to be copied. If the programmer does not wish to have the currently-specified distribution media size altered, processing proceeds to step S305, otherwise processing proceeds to flow diagram "A", shown in FIG. 7 and described in connection with FIG. 8.

In step S701, media size dialog box 48 is displayed to the programmer. Specifically, the programmer clicks on Config menu option 131 to display pull-down menu 133, and clicks on Media Size option 50, whereafter media size dialog box 48 is displayed. DDU 5 can also display media size dialog box 48 in response to a programmer's selection of "Defaults" option 143 and a subsequently displayed "Media Size" selection (not shown). As described above, defaults option 143 is used to change configuration defaults, including distribution media size, prior to generation of distribution utility window 35.

Media size dialog box 48 includes media list box 49, which lists a plurality of distribution media sizes 145 having their distribution media types in parenthesis. Examples of these distribution media sizes and types are shown in FIG. 8.

In step S702, the programmer selects a distribution media size from any of distribution media sizes 145 listed in media size list box 49. Next, in step S703, the programmer confirms the selected distribution media size by hitting OK button 47.

Once the selected distribution media size is confirmed, DDU 5 will modify disk1 36 (and any other added file storage designation areas, e.g., disk2, disk3, etc.) to reflect the selected distribution media size. For example, in the case that the distribution media size has been changed in disk1 36, DDU 5 modifies file information screen 38, shown in FIG. 5, to reflect the new media size of disk1 36. Thereafter, processing proceeds to step S305 in FIG. 3.

Figure 9:
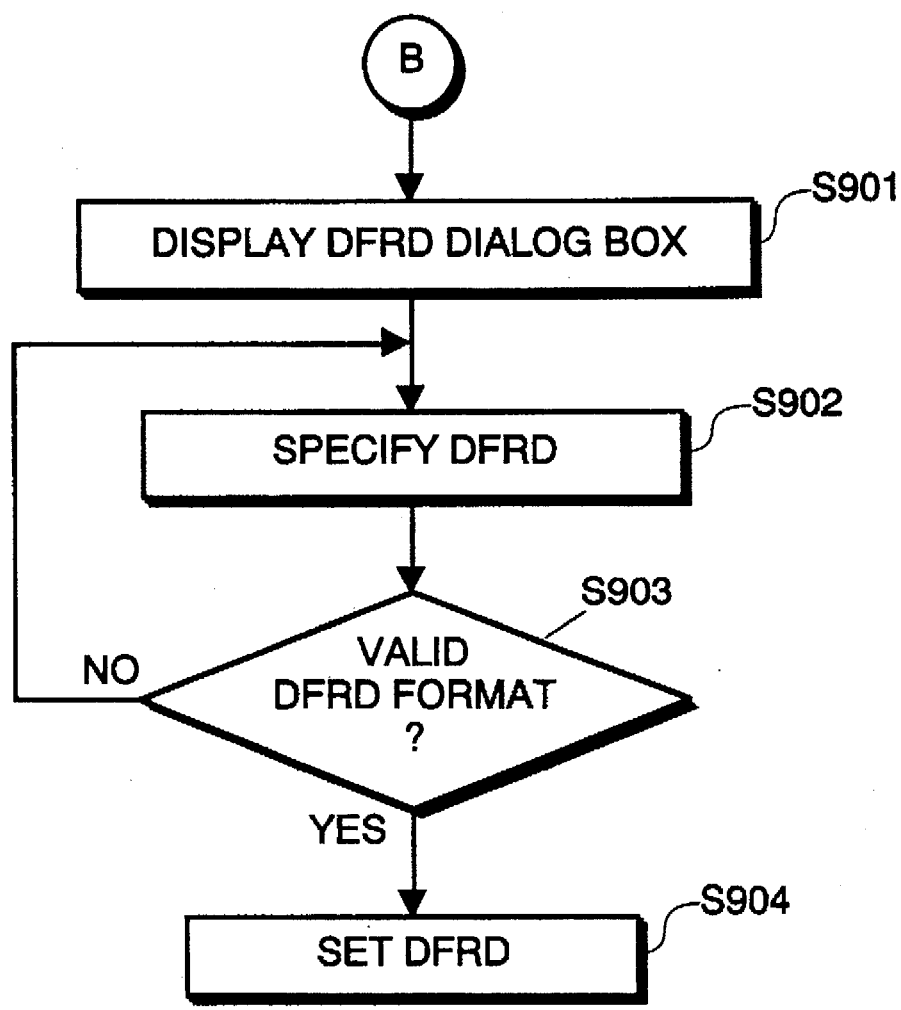
FIG. 9 is a flow diagram showing process steps for defining a data file root directory.
Figure 10:
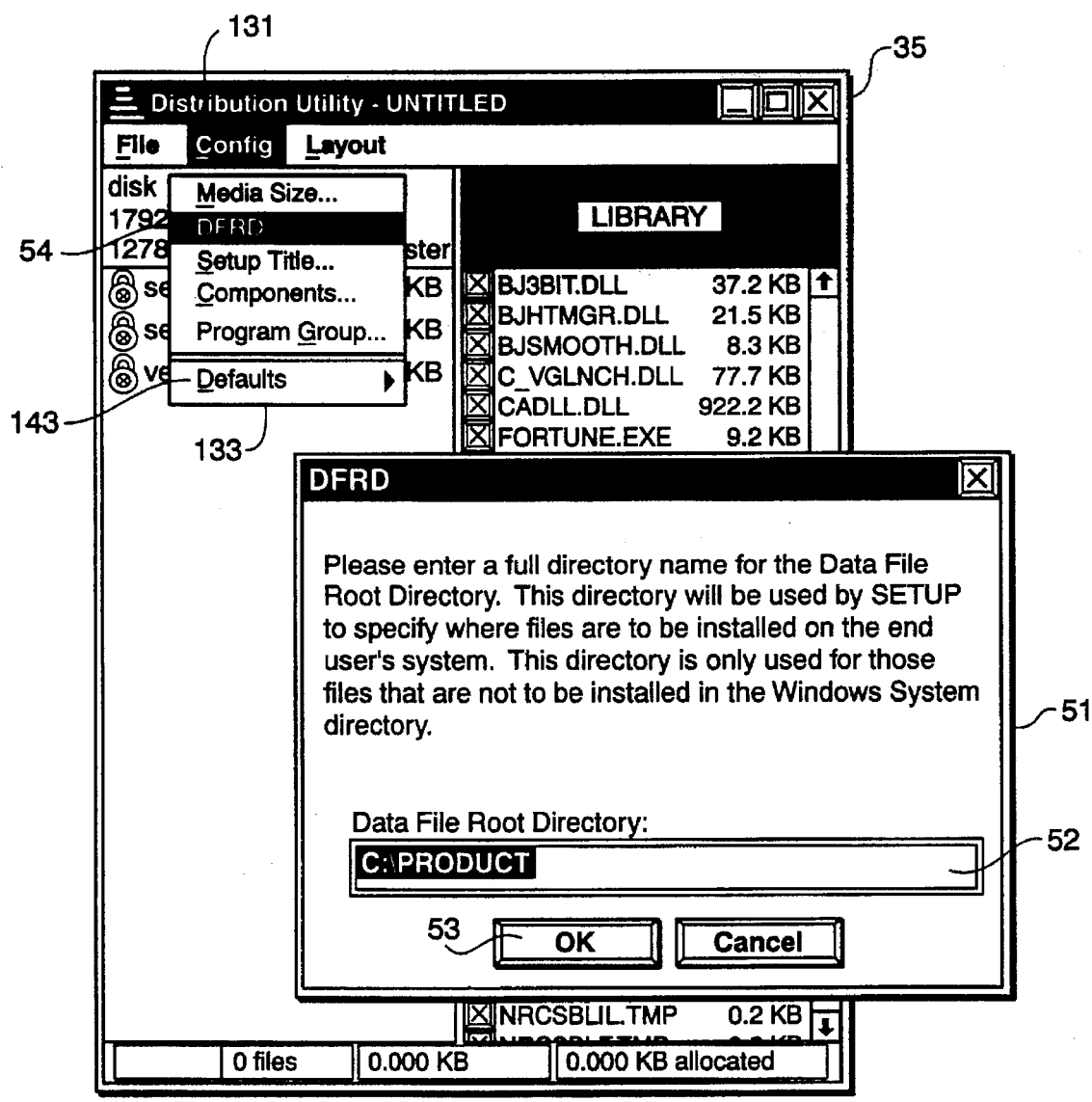
FIG. 10 shows a dialog box used to define a data file root directory.

In step S305, the programmer can alter the currently-specified DFRD. As indicated above, the DFRD is the directory on the end-user's system into which SETUP program 6 installs DDU-distributed files, from a distribution medium. If the programmer does not wish to alter the currently-specified DFRD, processing proceeds to step S306, otherwise processing proceeds to flow diagram "B", shown in FIG. 9 and described in connection with FIG. 10.

In step S901, DFRD dialog box 51 is displayed to the programmer. Specifically, the programmer clicks on Config menu option 131, and in response, DDU 5 displays pull-down menu 133. The programmer then clicks on DFRD option 54, and, in response, DDU 5 displays DFRD dialog box 51. DDU 5 can also display DFRD dialog box 51 in response to a programmer's selection of "Defaults" option 143 in pull-down menu 133, and a subsequently displayed "DFRD" selection (not shown). Defaults option 143 is used to change configuration defaults, including DFRD, prior to beginning a DDU session.

DFRD dialog box 51 includes DFRD specification box 52, onto which a programmer can enter a DFRD name. In step S902, the programmer enters a DFRD name into DFRD specification box 52, and confirms the DFRD name by clicking on OK button 53.

In step S903, DDU 5 determines whether the entered DFRD name is valid. More specifically, in step S903, DDU 5 determines whether the entered DFRD name is comprised of more than eight (8) characters and if any of the entered characters are improper characters. If DDU 5 determines that the entered DFRD name is comprised of more than eight characters, or that the DFRD name is comprised of improper characters, processing proceeds to step S902, where DDU 5 prompts the user to enter a new DFRD name by displaying DFRD dialog box 51. If, however, DDU 5 determines that the entered DFRD name is valid, processing proceeds to step S904.

In step S904, DDU 5 enters the new DFRD name in the product file, removes DFRD dialog box 51, and processing proceeds to step S306 in FIG. 3.

In step S306, the programmer can alter characteristics of the currently-specified setup title. As indicated above, the setup title is the title which SETUP program 6 displays on an end user's screen when SETUP program 6 installs, onto the end user's system, files from a distribution medium which were distributed by DDU 5. If the programmer does not wish to alter the currently-specified setup title, processing proceeds to step S307, otherwise processing proceeds to flow diagram "C", shown in FIG. 11 and described in connection with FIG. 12.

In step S1101, Setup Title dialog box 55 is displayed to the programmer. Specifically, the programmer clicks on Config menu option 131 to display pull-down menu 133, and by clicking on Setup Title option 60 displayed therein, Setup Title dialog box 55 is displayed.

Setup Title dialog box 55 includes title edit box 57, font type list box 58, font style list box 59, font size list box 61, underline check box 62, color list box 64, angle box 65, sample title box 67 and OK button 68. The foregoing options are used, as described in detail below, to set various characteristics of the setup title.

More specifically, in step S1102, the programmer can specify a setup title. If the programmer does not specify a setup title, the setup title will default to the title specified in the DDU initialization subroutine, such as "Untitled". Processing then proceeds to step S1104.

If, however, the programmer wishes to specify a setup title, processing proceeds to step S1103, where the programmer inputs the setup title in title edit box 57. The programmer can enter a multiple-line title in title edit box 57 by hitting the <ENTER> button (not shown) on keyboard 13 to create multiple lines.

In step S1104, the programmer can select a new setup title font type. If the programmer does not wish to select a new setup title font type, the default font type remains set, and processing proceeds to step S1106.

If, however, a new setup title font type is desired, processing proceeds to step S1105, at which point the programmer selects a setup title font type from font type list box 58. Once the programmer selects a setup title font type, such as "Times New Roman", shown in font type list box 58, processing proceeds to step S1106.

In step S1106, the programmer can select a new setup title font style. If a new setup title font style is not desired, the default setup title font style remains set, and processing proceeds to step S1108.

If, however, a new setup title font style is desired, processing proceeds to step S1107, where the programmer selects a setup title font style from font style list box 59. Font styles available in font style list box 59 include at least "Regular", "Italic", "Bold" and "Bold Italic". Once the programmer selects a setup title font style, such as "Bold", shown in font style list box 59, processing proceeds to step S1108.

In step S1108, the programmer can select a new setup title font size. If the programmer does not wish to select a new setup title font size, the default setup title font size remains set, and processing proceeds to step S1110.

If, however, a new setup title font size is desired, processing proceeds to step S1109, at which point the programmer selects a setup title font size from font size list box 61. Font sizes available in font size list box 61 include at least the following point sizes: 8, 9, 10, 11, 12, 14, 16, 18, 20, 22, 24, 26, 28, 36, 48 and 72. A programmer can specify font sizes other than these by modifying the font size default values in the DDU initialization subroutine, prior to beginning the DDU session. Once the programmer selects a setup title font size, such as "14", shown in font size list box 61, processing proceeds to step S1110.

In step S1110, the programmer can select a new setup title color. A setup title color, of course, will only be relevant in the case where an end-user has a color computer screen. If the programmer does not wish to select a new setup title color, processing proceeds to step S1112.

If, however, the programmer wishes to select a new setup title color, processing proceeds to step S1111, where the programmer selects a setup title color from color list box 64. Colors available in color list box 64 include at least "Black", "Blue", "Cyan", "Green", "Magenta", "Red", "Yellow" and "White". For each color selection displayed, DDU 5 displays a rectangle of color in color list box 64. Once the programmer selects a setup title color, such as "Black", shown in color list box 64, processing proceeds to step S1112.

In step S1112, the programmer can select an underline option so that the setup title is underlined when it is displayed. If the programmer does not wish to select the underline option, the default setting remains set, and processing proceeds to step S1114.

If, however, an underlined setup title is desired, processing proceeds to step S1113, at which point the programmer clicks on underline check box 62. Once the programmer clicks on underline check box 62, processing proceeds to step S1114.

In step S1114, the programmer can specify a new setup title angle. The setup title angle refers to an angle of the setup title relative to 0°. If the programmer does not wish to specify a new setup title angle, the default angle remains set, and processing proceeds to step S1116.

If, however, a new setup title angle is to be specified, processing proceeds to step S1114, at which point the programmer enters a setup title angle in angle box 65. In a preferred embodiment of the present invention, angle values between 0° and 90° can be entered in increments of 1' (one minute). Once the programmer specifies a new setup title angle in angle box 65, processing proceeds to step S1116.

Figure 11:
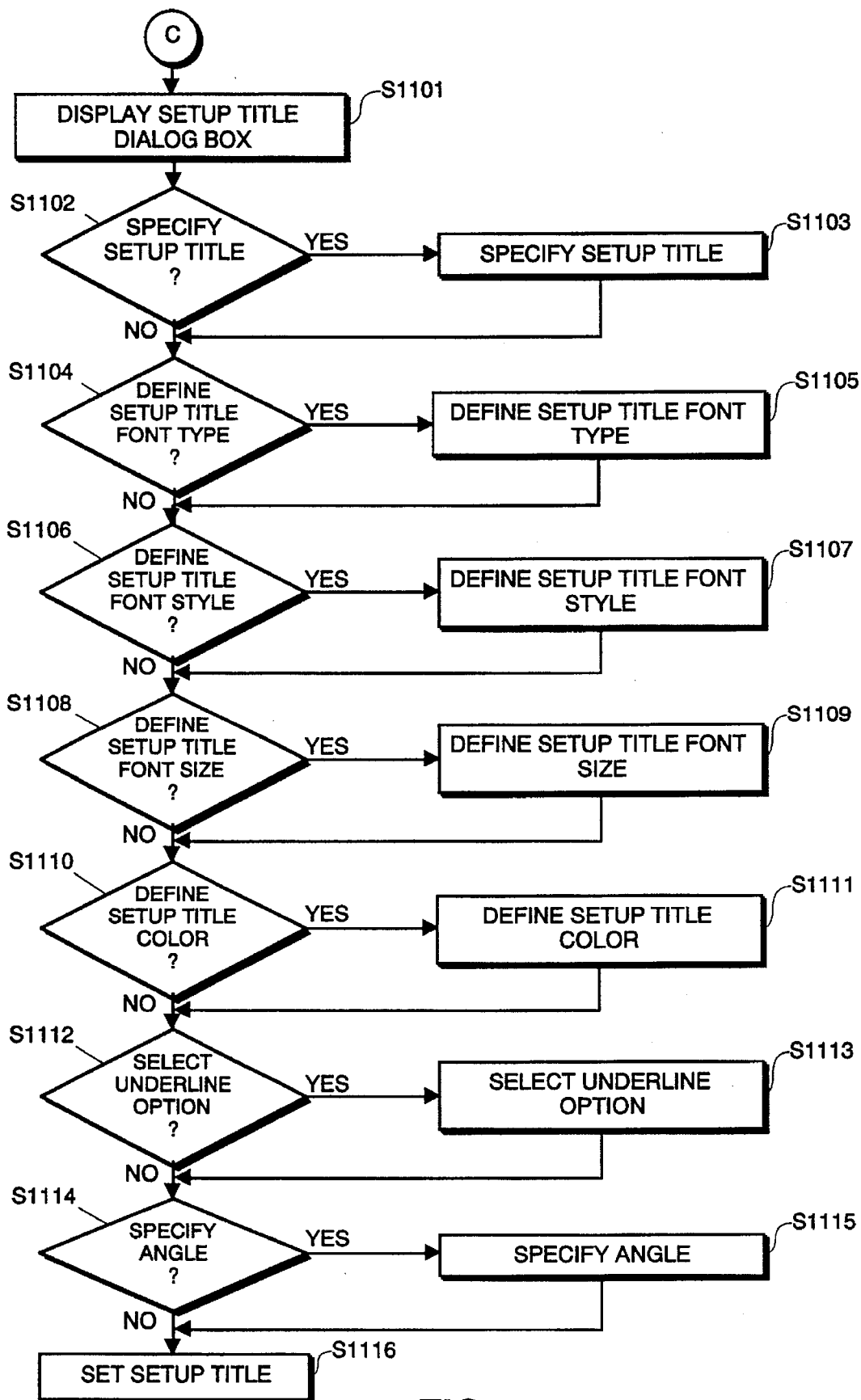
FIG. 11 is a flow diagram showing process steps for defining a setup title.
Figure 12:
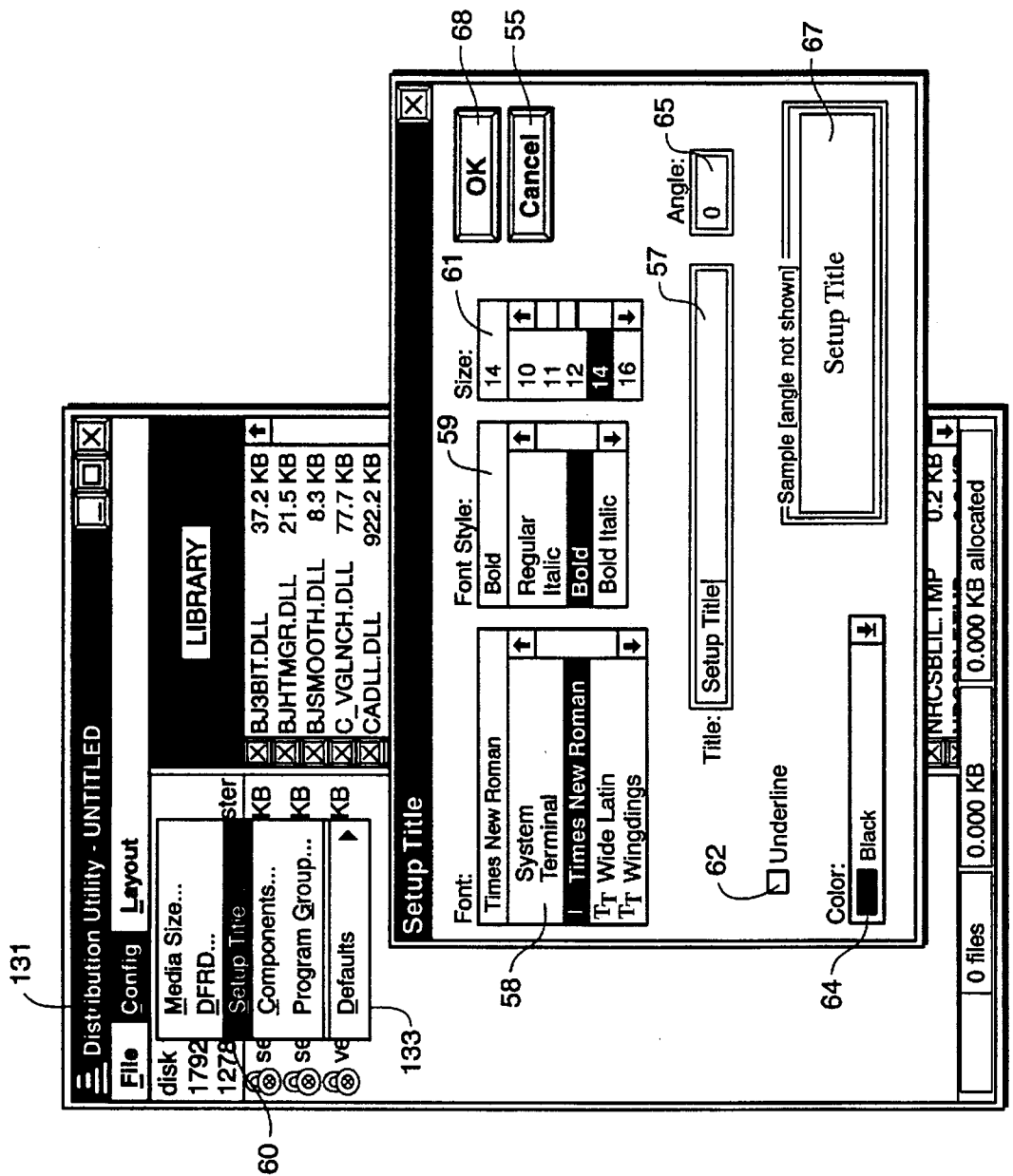
FIG. 12 shows a dialog box used to define a setup title.

It is noted that the foregoing setup title options can be selected in any order, and that the order for choosing the setup title options is not in any way limited by the order shown in FIG. 11.

In step S1116, the programmer can confirm the foregoing options specified in setup title dialog box 55 by clicking on OK button 68. Once the setup title options are confirmed, DDU 5 enters the setup title configuration settings in the current product file and setup title dialog box 55 is closed. Processing then proceeds to step S307 in FIG. 3.

Figure 13:
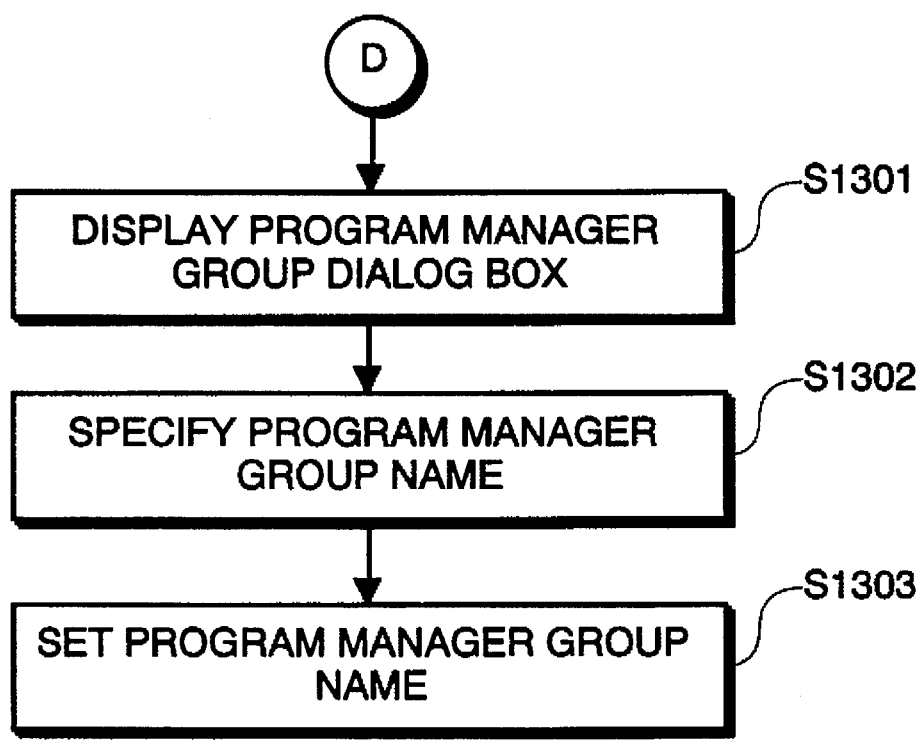
FIG. 13 is a flow diagram showing process steps for defining a program manager group.
Figure 14:
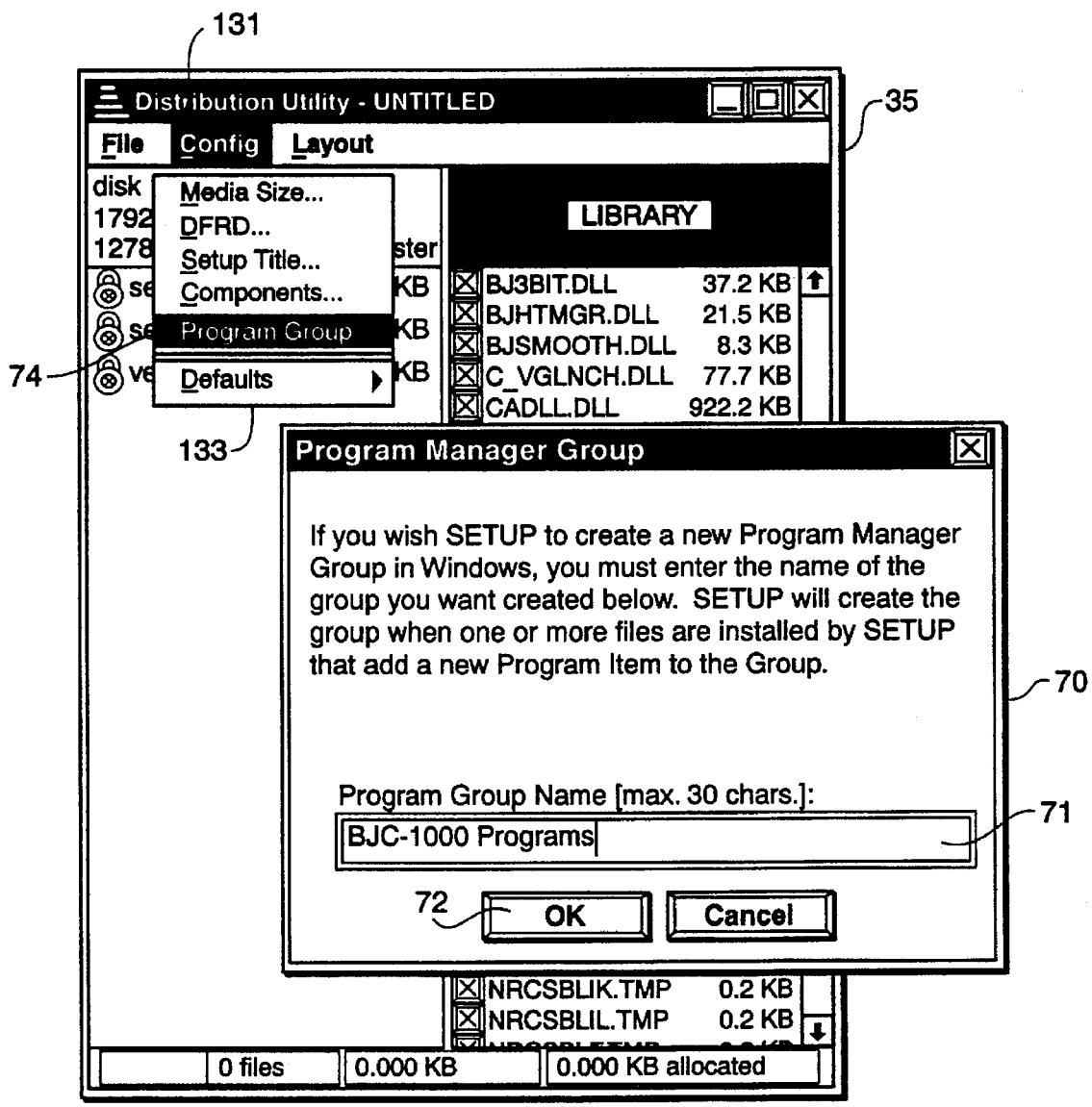
FIG. 14 shows a dialog box used to define a program manager group.

In step S307, the programmer can specify a program manager group name for the current DDU session. The program manager group name is added, by SETUP program 6, to the Windows'® Program Manager (or other Windows® Shell), which creates icons for DDU-distributed files on an end-user's system. If the programmer does not wish to have icons created on the end user's system for files distributed by DDU 5, processing proceeds to step S308. Otherwise processing proceeds to flow diagram "D", shown in FIG. 13 and described in connection with FIG. 14.

In step S1301, program manager group dialog box 70 is displayed to the programmer. Specifically, the programmer clicks on Config menu option 131 to display pull-down menu 133, and by clicking on Program Group option 74 displayed therein, program manager group dialog box 70 is displayed.

Program manager group dialog box 70 includes program manager group name box 71, onto which the programmer can enter a program manager group name. In step S1302, the programmer enters a program manager group name into program manager group name box 71.

In step S1303, the programmer confirms the entered program manager group name by clicking on OK button 72.

Once the program manager group name is confirmed, program manager group dialog box 70 is removed by DDU 5; DDU 5 enters the program manager group name into the current product file; and processing proceeds in accordance with the flow diagram shown in FIG. 3. More specifically, processing proceeds to step S308.

Figure 15:
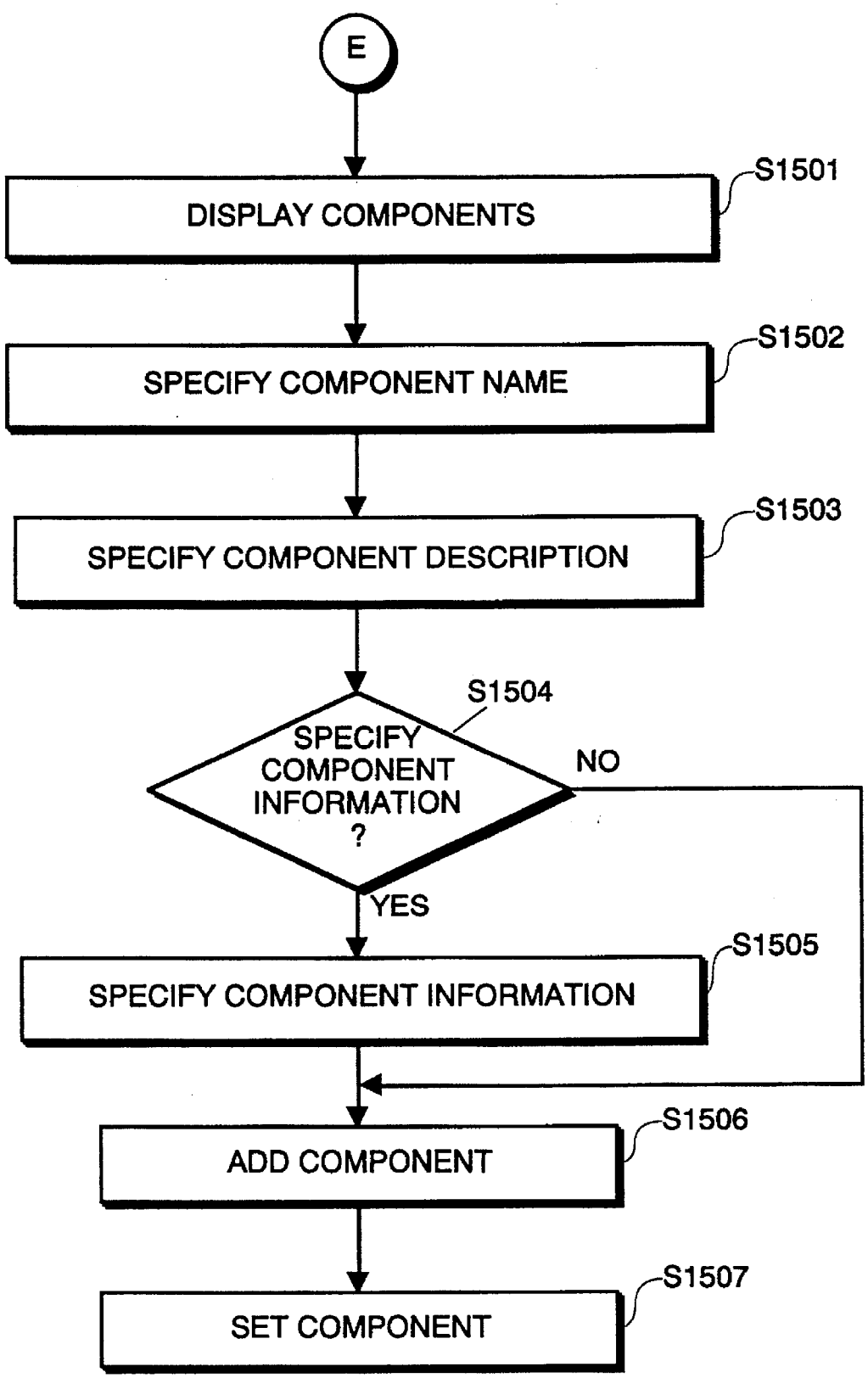
FIG. 15 is flow diagram showing process steps for defining new components.

In step S308, the programmer can alter any currently-specified components or create new components. As indicated above, a component is one or more groupings of individual files created DDU 5. For example, a plurality of files comprising a single application program may be considered a component or an application upgrade can be considered a component. If existing components are not to be altered or new components are not to be added, processing proceeds to step S310. Otherwise processing proceeds to step S309 in order to add a new component or to modify an existing component. In the case that the programmer wishes to add a new component, processing proceeds to flow diagram "E", shown in FIG. 15 and described in connection with FIGS. 16 and 17.

More specifically, in step S1501, the programmer clicks on Config menu option 131 to display pull-down menu 133, and, by clicking on Components option 78 displayed therein, components dialog box 75 is displayed.

Components dialog box 75 includes component name box 76, component description box 77, component information box 79, components list box 81, install check box 82, ADD button 83, DELETE button 84, OK button 86, and CANCEL button 87, which are described in detail below.

In step S1502, the programmer specifies a component name in component name box 76. Component names specified in component name box 76 define a component. For the example shown in FIG. 17, the specified component name is "GUIDE".

In step S1503, the programmer adds a component description to component description box 77. Since DDU 5 will not permit a component to be added without a component description, a component description must always be specified when adding a component. The component description is presented by SETUP program 6 when an application is installed on an end-user's system from a storage medium having DDU-distributed files. In the present example, the component description is "BJC-1000 Visual Guide".

Following step S1503, processing proceeds to step S1504. In step S1504 the programmer can specify component information for a named component. Component information is information that provides an end-user with more detail about a component being installed by SETUP program 6. This need not be filled out in order to define a component.

In the case that component information is not specified, processing proceeds to step S1506. However, in the case that component information is specified, processing proceeds to step S1505, where a programmer inputs component information into component information box 79. In the example shown in FIG. 17, the component information is "This program gives you on-line help". Following step S1505, processing proceeds to step S1506.

In step S1506, the programmer can direct DDU 5 to add the defined component. If, in step S1507, the programmer does not wish to add the defined component, the programmer can click on CANCEL button 87, or the programmer can redefine the component, in which case processing proceeds back to the point where redefinition is desired.

If, however, in step S1506, the programmer wishes to add the defined component to the product file, the programmer clicks on ADD button 83.

If the name of the component that the programmer wishes to add is already used, DDU 5 issues an error message to the programmer and, thereafter, prompts the programmer to redefine the component's name. Upon successful addition of a component name, in step S1507, DDU 5 adds the component to components list box 81, and DDU 5 clears component name box 76, component description box 77 and component information box 79 in anticipation of addition of a new component. Components dialog box can be removed by clicking on OK button 86, which confirms characteristics of a component, or CANCEL button 87.

If, in step S309, the programmer wishes to modify an existing component, processing proceeds to flow diagram "F", shown in FIG. 18 and described in connection with FIG. 19. It is noted that the processing shown in FIG. 18 can be performed while adding a new component. However, for the sake of clarity, it will be described separately.

In step S1801, DDU 5 displays components dialog box 75. This step is identical to step S1502 of FIG. 15. A detailed description of this step is therefore omitted for the sake of brevity. Processing the proceeds to step S1802.

In step S1802, the programmer can instruct DDU 5 to delete an existing component. If the programmer does not wish to have an existing component deleted, or alternatively, if there are no existing components to delete, processing proceeds to step S1805.

If, however, in step S1802, the programer wishes to have an existing component deleted, in step S1803, the programmer selects the existing component from components list box 81. When the existing component is selected, as is the case with selected existing component 89 shown in FIG. 18, DDU 5 highlights the component. Once existing component 89 is selected, processing proceeds to step S1804, where selected existing component 89 is deleted.

Upon the programmer clicking on DELETE button 84, DDU 5 deletes selected existing component 89. Specifically, when a programmer clicks on DELETE button 84, the programmer is prompted by DDU 5 with a confirmation message asking the programmer whether or not the programmer wishes have the component deleted. Once deletion is confirmed, DDU 5 deletes existing component 89. Processing then proceeds to step S1805.

In step S1805, the programmer can specify automatic installation, by SETUP program 6, of selected existing component 89. If the programmer does not wish to specify automatic installation of selected existing component 89, processing proceeds to step S1808. If, however, the programmer wishes to specify automatic installation of selected existing component 89, processing proceeds to step S1806 where the programmer selects the existing component from components list box 81, and then to step S1807 where the programmer clicks on install by default check box 82. Thereafter, processing proceeds to step S1804, where the programmer confirms the component modifications by clicking on OK button 86. Once the programmer confirms the component modifications, DDU 5 modifies the component as specified by the programmer.

Figure 18:
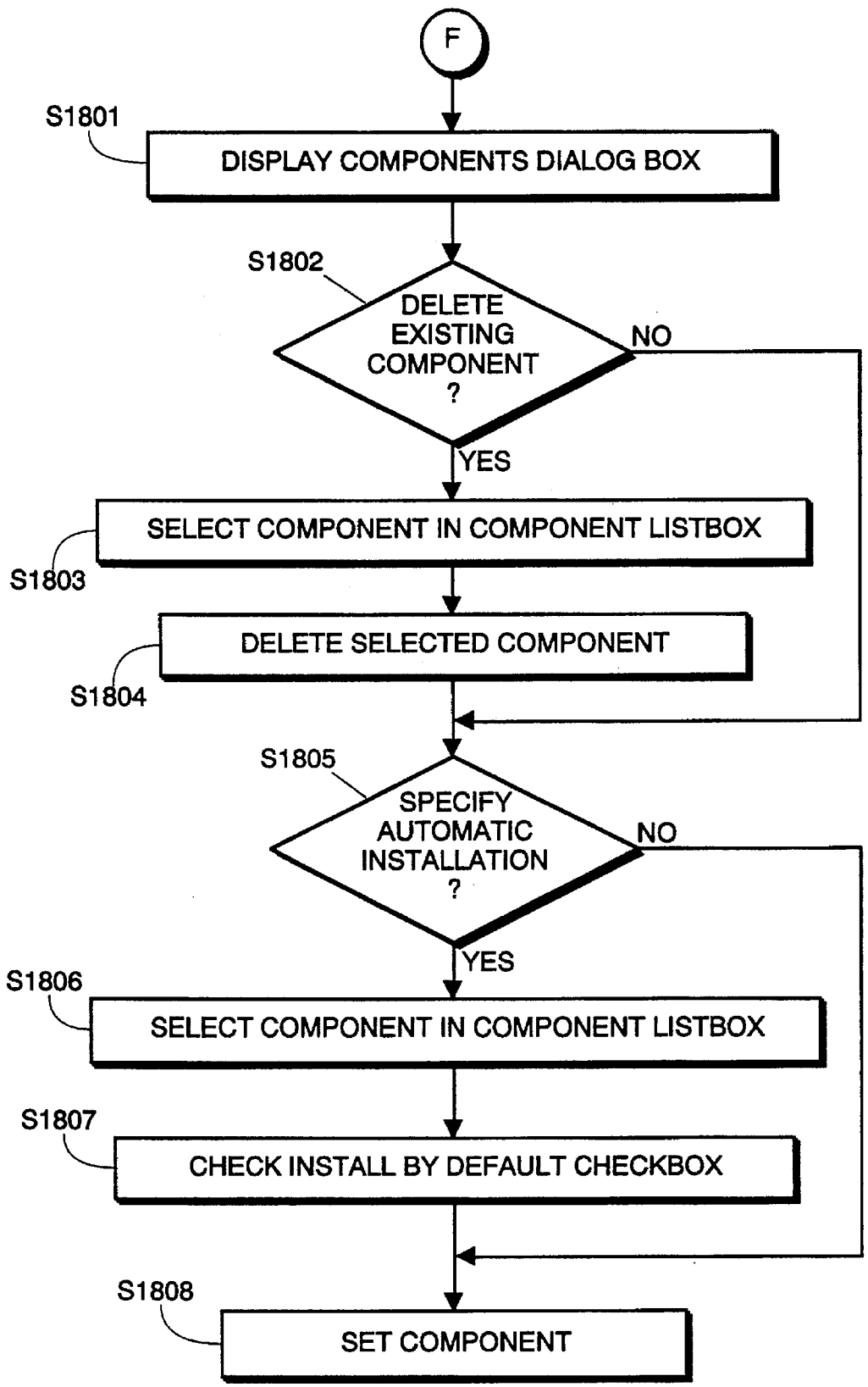
FIG. 18 is a flow diagram showing process steps for modifying existing components.
Figure 19:
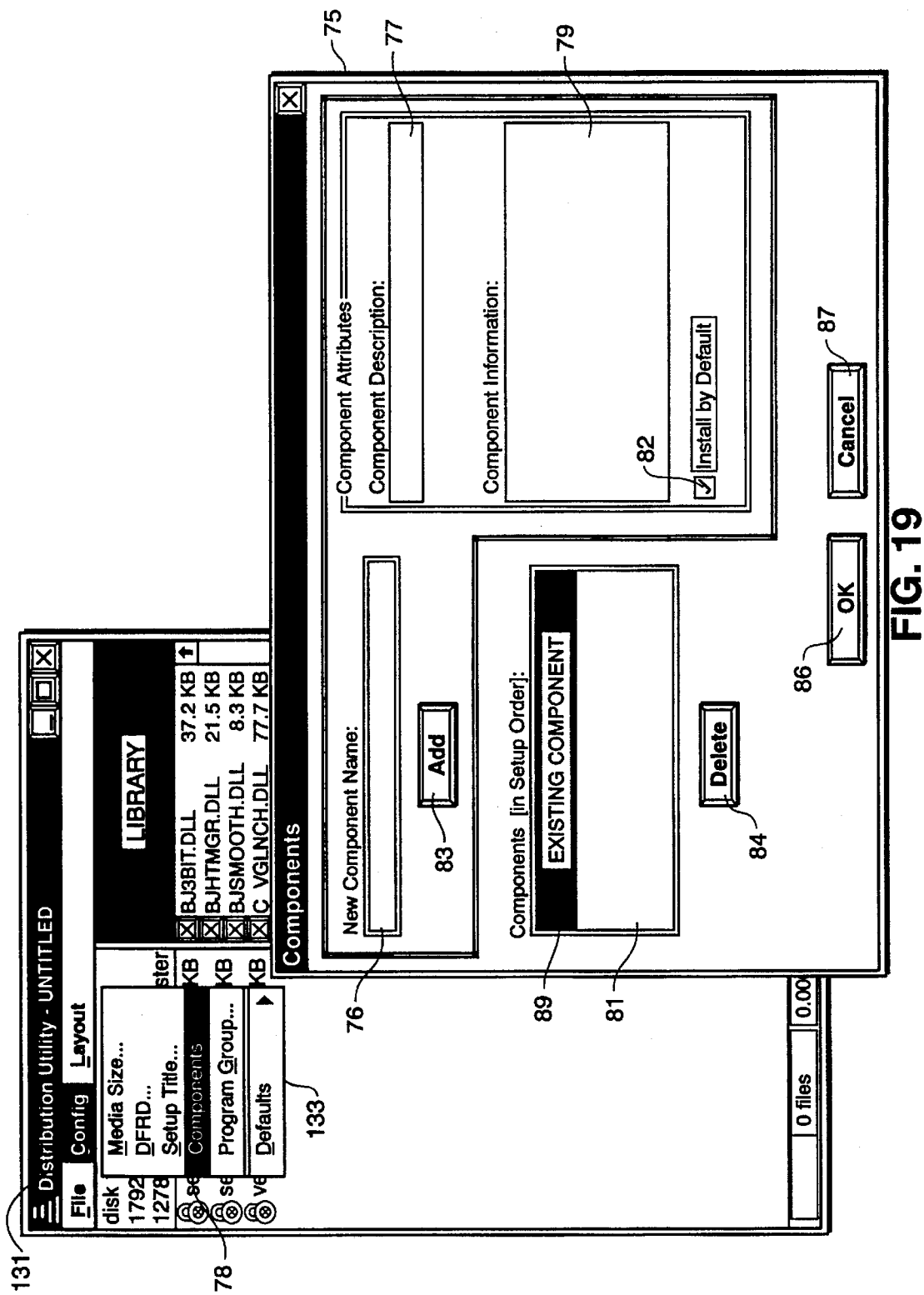
FIG. 19 shows a dialog box used modify existing components.

It is noted that the processing shown in FIG. 18 can be performed in any order, and is not limited by the order shown in FIG. 18. For example, specifying automatic installation can occur before component deletion, if desired.

Once the component modifications are confirmed, components dialog box 75 is closed, and processing proceeds to step S310 in FIG. 3.

At this point, it is noted that selection of DDU configuration options, shown in steps S304 to S308, need not be performed in the order shown in FIG. 3. Rather, they can be performed in any order desired by the programmer. For example, DFRD can be defined first, followed by components definition, etc.

In step S310, the programmer selects files in library 37 which are to be "dragged and dropped" to disk1 36, or to any other file storage designation areas that may be present in distribution utility window 35, by clicking on the files.

Figure 16:
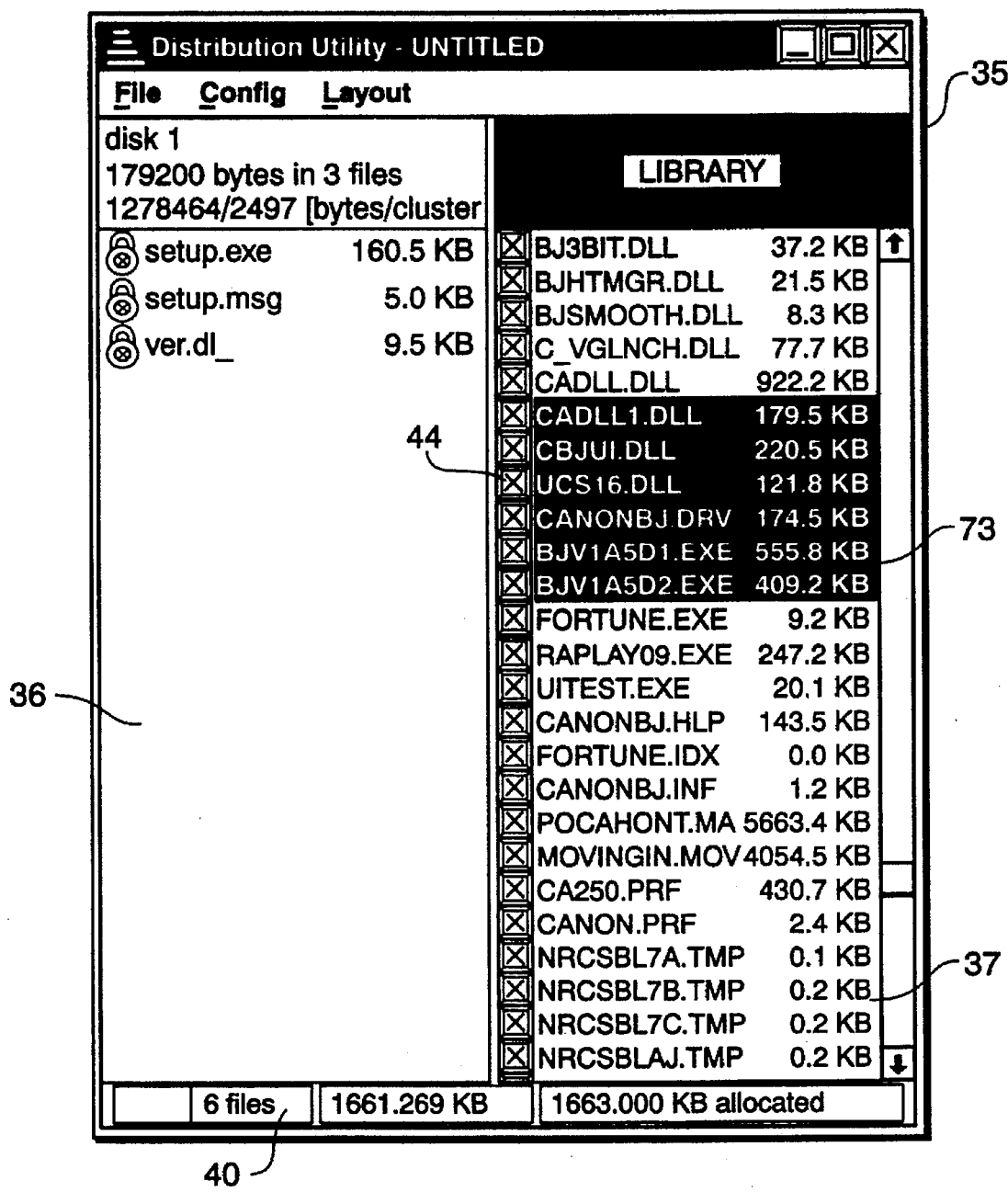
FIG. 16 shows selected files in an initial workspace generated by the present distribution diskette utility system.
Figure 17:
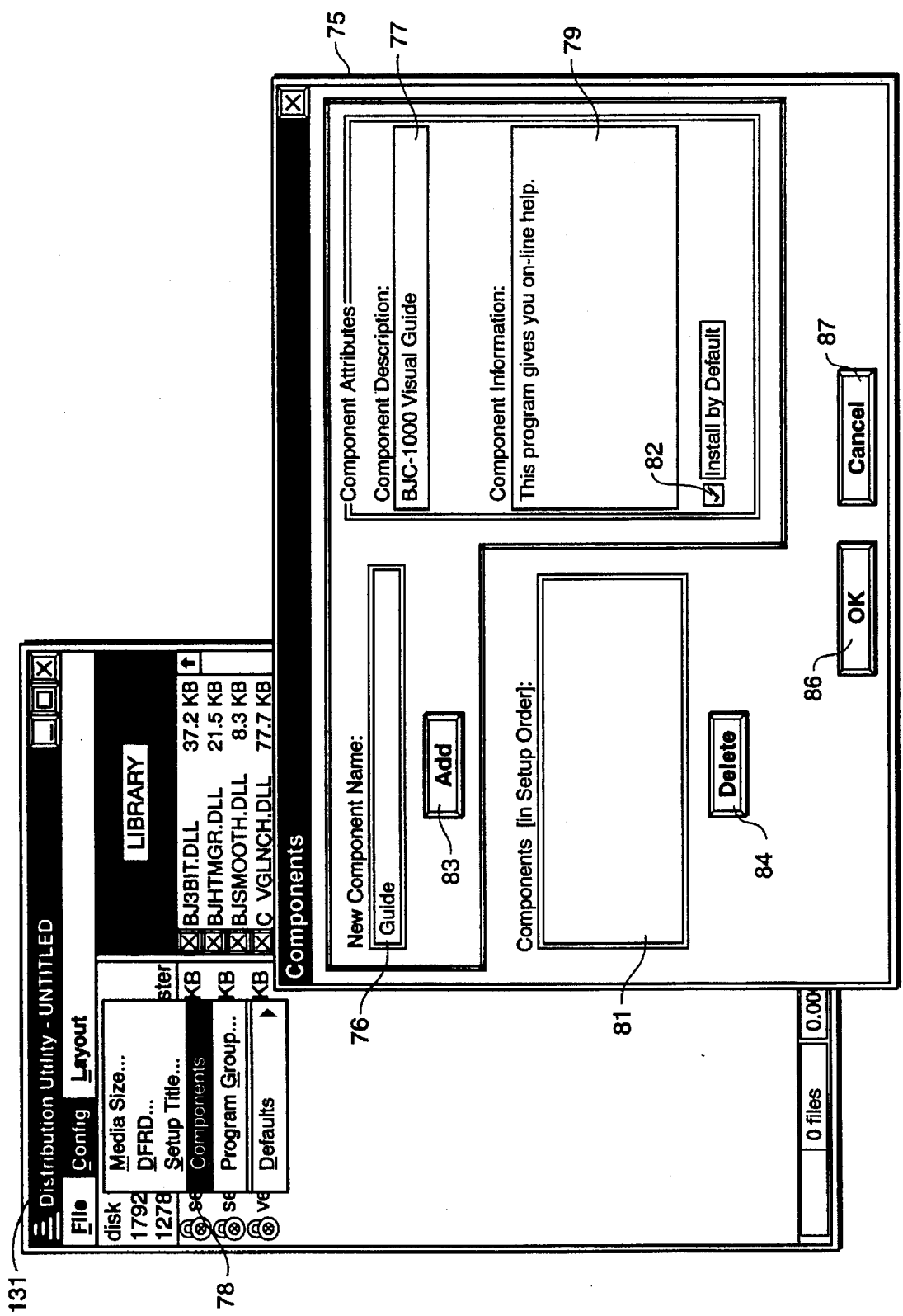
FIG. 17 shows a dialog box used to define new components.

FIG. 16 shows selected files 73, highlighted in black. While these files have been selected to be dragged and dropped in disk1 36, they cannot be dragged and dropped until they have been assigned attributes. As discussed above, it is clear from the presence of indicator icons, such as indicator icon 44, that the selected files have not been assigned attributes. Processing therefore proceeds to step S311.

[Defining File Layout]

In step S311, the programmer determines whether to define the layout of selected files 73, which includes specifying file attributes for the selected files If, as shown in step S311, the programmer does not wish to define the layout of selected files 73, processing ends, as shown in FIG. 3.

Thereafter, the programmer can exit DDU 5 by clicking on File menu option 130 to display pull-down menu 148 and then clicking on Exit option 149, as shown in FIG. 4. Exit option 149 permits a programmer to terminate the current DDU session. If there is currently a product file open and not saved since it was last modified, as is the case in the product file described thus far, upon selection of Exit option 149, DDU 5 will prompt the programmer to save the currently-open product file. If the programmer wishes to save the currently-open product file, the programmer must select Save option 150 or Save As option 118, both of which are found in pull-down menu 148 and are described below. If, however, the programmer wishes to terminate without saving, or, alternatively, if no product file were open, DDU 5 merely terminates the session.

Rather than exiting, the programmer may wish to reconfigure the general configuration settings of DDU 5, in which case processing proceeds back to step S303.

Figure 21:
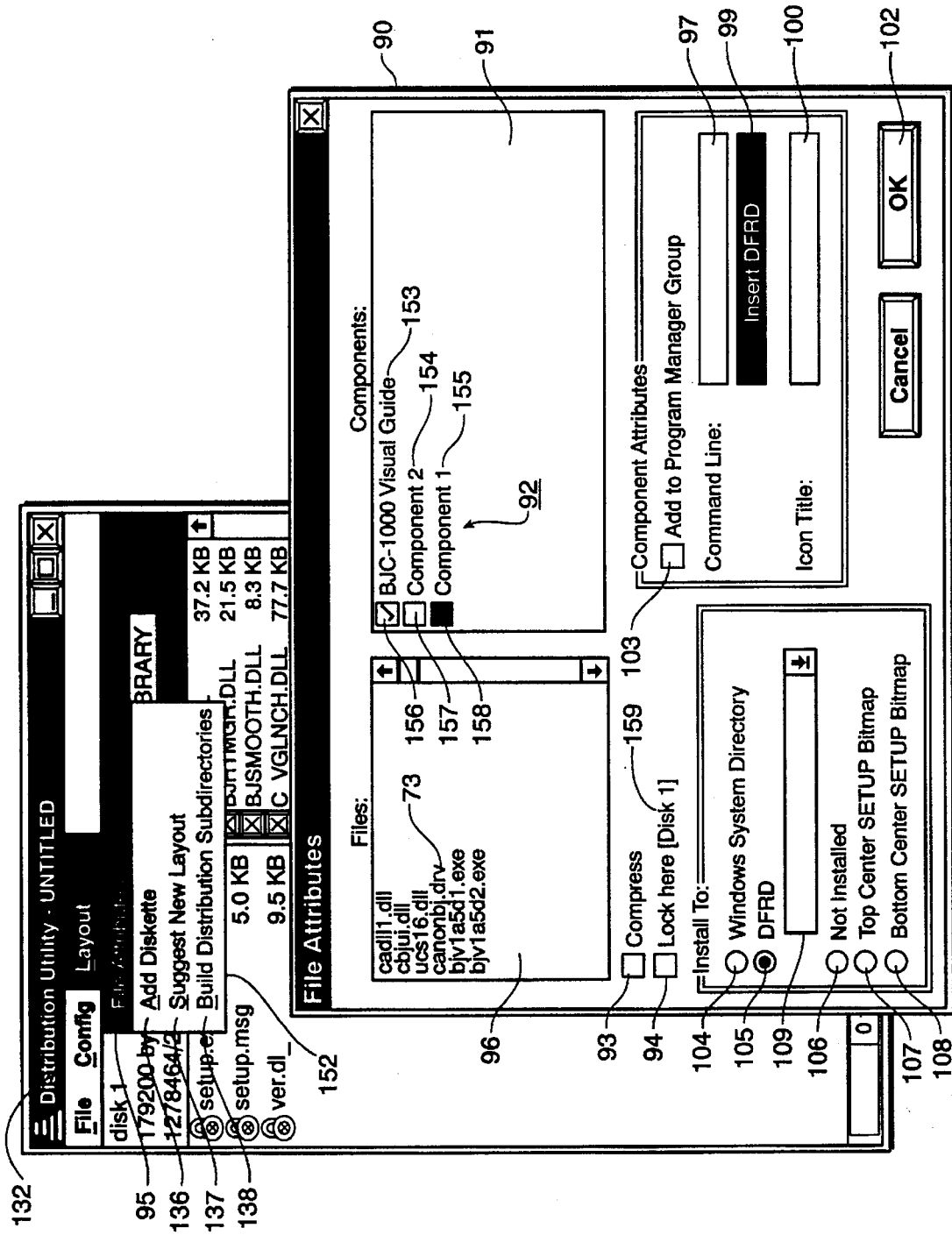
FIG. 21 shows a dialog box used to define file attributes for selected files.

If, however, in step S311 the programmer wishes to define the layout of selected files 73, which includes assigning attributes to selected files 73, the programmer clicks on Layout menu option 132. Upon clicking on Layout menu option 132, pull-down menu 152 is displayed, as shown in FIG. 21.

Pull-down menu 152 includes (1) "File Attributes" option 95, which a programmer can select to assign attributes to selected files 73, (2) "Add Diskette" option 95, which a programmer can select to add a new file storage designation area to distribution utility window 35, (3) "Suggest New Layout" option 137, which a programmer can select to request a computer-implemented distribution of selected files 73 onto displayed file storage distribution areas and (4) "Build Distribution Subdirectories" option 152, which a programmer can select to cause DDU 5 to create a subdirectory for each displayed file distribution area and to copy files from the current working directory to the subdirectories. Each of these selections is described in more detail below.

Figure 20:
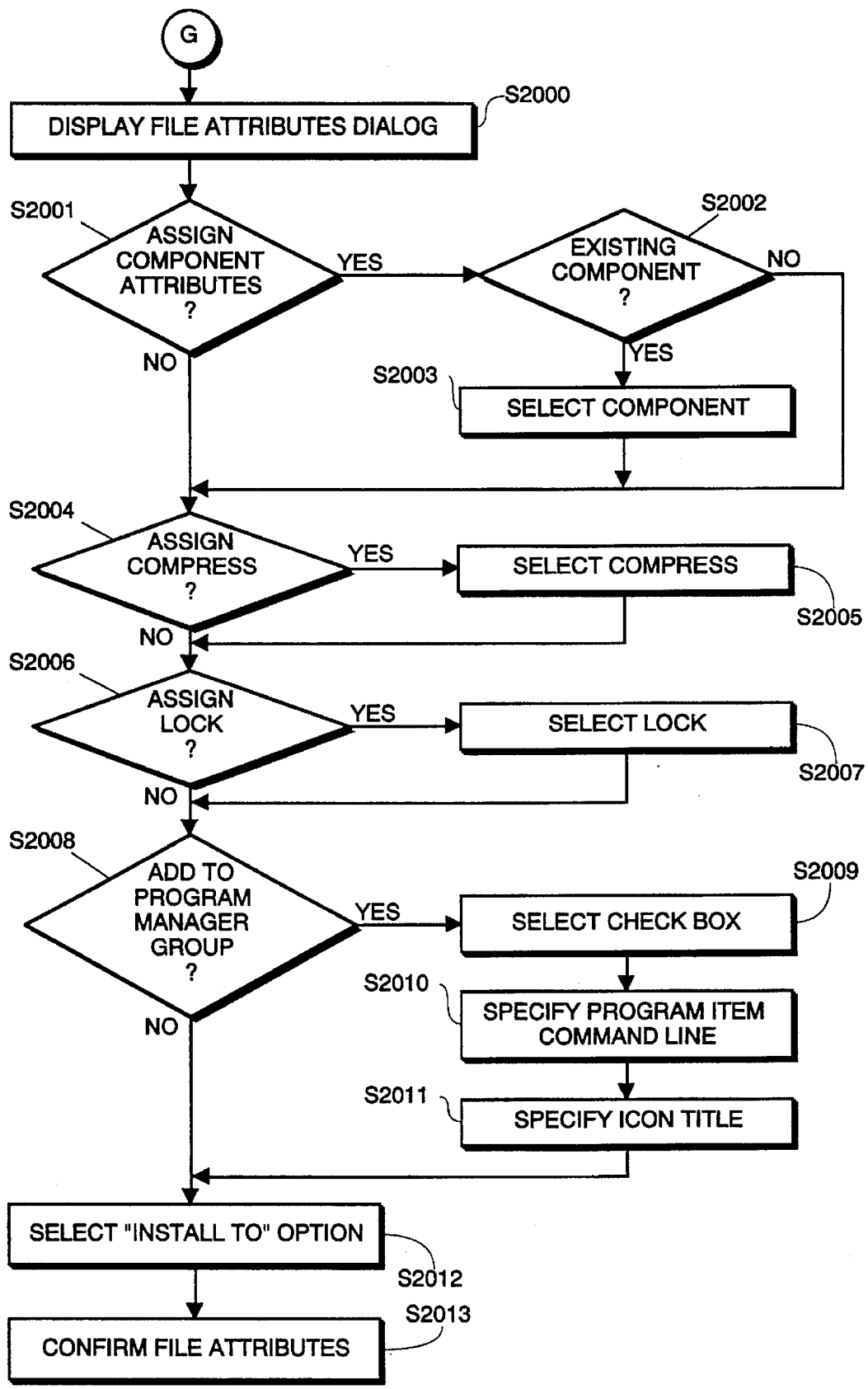
FIG. 20 is a flow diagram showing process steps for defining file attributes for selected files.

Thus, in step S312, the programmer can assign attributes to selected files 73. Files which do not have attributes assigned to them cannot be listed on disk1 36 or any other file storage designation area. Therefore, if, in step S312, the programmer does not wish to assign file attributes to selected files 73, processing proceeds to END. If, however, the programmer wishes to assign file attributes to selected files 73, processing proceeds to flow diagram "G", shown in FIG. 20 and described in connection with FIG. 21 and FIG. 22.

In step S2001, file attributes dialog box 90 is displayed by DDU 5 in response to the programmer's input. Specifically, the programmer clicks on Layout menu option 132 to display pull-down menu 152, and clicks on File Attributes option 95, whereafter DDU 5 displays file attributes dialog box 90.

File attributes dialog box 90 includes components list box 91 containing existing components 92 (i.e., BJC-1000 Visual Guide 153, Component2 154 and Component1 155), compress check box 93, lock check box 94, files list box 96 containing selected files 73 (see also FIG. 16), add to program manager group check box 103, command line 97, insert DFRD button 99, icon title command line 100, OK button 101, "install to" radio buttons 104 to 108, DFRD list box 109 and tri-state check boxes 156 to 158, all of which are described in more detail below.

In step S2001, the programmer can assign component attributes to selected files 73, which are displayed alphabetically in files list box 96. If, in step S2001, the programmer wishes to assign component attributes to selected files 73, processing proceeds to step S2002, where it is determined whether a component exists.

Whether a component exists is reflected in components list box 91, which lists all existing components alphabetically, with a corresponding tri-state check box, such as tri-state check box 156. Three existing components are displayed in components list box 91: BJC-1000 Visual Guide 153 (as may have been defined in flow diagram "E", shown in FIG. 15), Component2 154 and Component1 155.

In step S2002, in the case that no component is present in components list box 91, processing proceeds to step S2004. However, since, in the present example, at least one component is present in components list box 91, processing proceeds to step S2003, where the programmer selects a component.

The programmer selects a component for selected files 73 by clicking on the tri-state check box that corresponds to the component to which selected files 73 are to be assigned. In the example shown in FIG. 21, selected files 73 are assigned to BJC-1000 Visual Guide 153, as indicated by the check mark in tri-state check box 156 for BJC-1000 Visual Guide component 153.

It is noted that, when file attributes dialog box 90 is initially displayed, tri-state check boxes may indicate that selected files 73 are already grouped into existing components. A check mark in a tri-state check box indicates that all of selected files 73 are assigned to the component that corresponds to the tri-state check box. A blank tri-state check box indicates that none of the selected files, such as selected files 73, are assigned to that component. For example, tri-state check box 156, which corresponds to Component2 154, remains blank since none of selected files 73 are assigned to that component. A shaded tri-state check box, such as tri-state check box 158 which corresponds to Component1 155, indicates that only some of selected files 73 are assigned to that component. In this way, a programmer can determine if a group of files that have been assigned to different components has been selected.

Following step S2003, processing proceeds to step S2004, where the programmer can choose to compress selected files 73. If the programmer does not wish to have selected files 73 compressed, processing proceeds to step S2006. If, however, the programmer wishes to have DDU 5 compress selected files 73, processing proceeds to step S2005. In step S2005, the programmer clicks on compress check box 93 in order to compress selected files.

Compress check box 93 is a tri-state check box. Specifically, if the programmer selects compress check box 93, or alternatively, if selected files 73 are already compressed, a check mark appears in compress check box 93 which indicates that all of selected files 73 are compressed. If, however, compress check box 93 is blank, none of selected files 73 have been compressed. Alternatively, if compress check box 93 is shaded, such as tri-state check box 158, this indicates that some of selected files 73 are compressed and some are not compressed.

Following step S2005, processing proceeds to step S2006, at which point the programmer can lock selected files 73 to the file storage designation area of disk display 159, which is shown in parentheses next to lock check box 94. In the present example, since selected files 73 currently reside in library 37, "disk1" is displayed.

If the programmer does not wish to lock selected files 73 onto a file storage designation area, such as disk1 36, processing proceeds to step S2008. If, however, the programmer wishes to lock selected files 73 onto disk1 36, processing proceeds to step S2007.

In step S2007, the programmer selects lock check box 94. As was the case with respect to compress check box 93, lock check box 94 is also a tri-state check box. In short, when all of selected files 73 are locked on the displayed file storage designation area, in this case disk1 36, a check mark appears in lock check box 94; when none of selected files 73 are locked on disk1 36, lock check box 94 is blank; and when some of selected files 94 are locked on disk1 36 and some of selected files 94 are not locked on disk1 36, lock check box 94 is shaded. When a file is locked onto a disk, the file appears in the file storage designation area with a corresponding locking icon, such as locking icon 43, shown in FIG. 5.

Following step S2007, processing proceeds to step S2008. In step S2008, files can be added to the program manager group specified in the program manager group dialog box described above with respect to FIGS. 13 and 14.

In the case that the programmer does not wish to add the selected file to the program manager group, or if more than one file is displayed in files list box 96, processing proceeds to step S2012. If, however, a selected file is to be added to the program manager group, processing proceeds to step S2009.

In step S2009, the programmer clicks on add to program manager group check box 103. Add to program manager group check box 103 is disabled if there is more than one file in files list box 96, or if the programmer has not specified a program manager group to be added in the program manager group dialog box, shown in FIG. 14.

Following step S2009, processing proceeds to step S2010, where the programmer can define, on command line 97, the installation path for a selected file which is to be added to the program manager group. At this point, the programmer can also click on Insert DFRD button 99, which will place the currently specified DFRD on command line 97, so as to aid the programmer in specifying the installation path of the selected file. If the programmer does not define, on command line 97, an installation path, the selected file is installed in the Windows'® Program Manager.

Processing then proceeds to step S2011. In step S2011, the programmer can specify an icon title for the selected file by entering an icon title on icon title command line 100. If no icon title is specified, the icon created by the program manager group will be labelled "Untitled". Thereafter, processing proceeds to step S2012.

At this point, if no other file attributes have been specified, the "Install To" file attributes, assigned in step S2012, must be assigned to a selected file before that file can be moved out of library 37 and onto disk1 36.

Radio buttons 104 to 108 allow the programer to specify the target directory on an end-user's system for selected files 73. As shown in FIG. 21, radio button 104 corresponds to Windows® System Directory, radio button 105 corresponds to DFRD, radio button 106 corresponds to Not Installed, radio button 107 corresponds to Top Center SETUP Bitmap and radio button 108 corresponds to Bottom Center SETUP Bitmap.

Radio button 104, when selected, indicates that selected files 73 will be installed by SETUP program 6 in the Windows® system directory of the end-user's system; radio button 105, when selected, indicates that selected files 73 will be installed by SETUP program 6 in the DFRD, or some subdirectory thereof, in the end-user's system; radio button 106, when selected, indicates that selected files 73 will not be installed by SETUP program 6; radio button 107, when selected, indicates that selected files 73 are bitmaps and that they are to be displayed by SETUP program 6 in the top center of the end-user's screen; and radio button 108, when selected, indicates that selected files 73 are bitmaps and that they are to be displayed by SETUP program 6 in the bottom center of the end-user's screen.

If selected files 73 are already assigned Install To attributes, and these attributes are different for individual files, none of the foregoing radio buttons will be selected.

If, however, the programmer desires to have SETUP program 6 install selected files 73 to one of the foregoing Install To options, in step S2012 the programmer can select one of the foregoing radio buttons.

For the Install To attributes, the default target directory is DFRD, if a DFRD is specified, otherwise the default target directory is the Windows® System Directory. DFRD list box 109 permits a programmer to specify a subdirectory of the DFRD into which selected files 73 are to be installed. The programmer, however, will not be permitted, in DFRD list box 109, to specify an installation path outside of the DFRD.

Next, in step S2013, the programmer can confirm any defined file attributes by clicking on OK button 102. Once the defined file attributes are confirmed, DDU 5 adds the specified file attributes to selected files 73 and removes file attributes dialog box 90.

Figure 22:
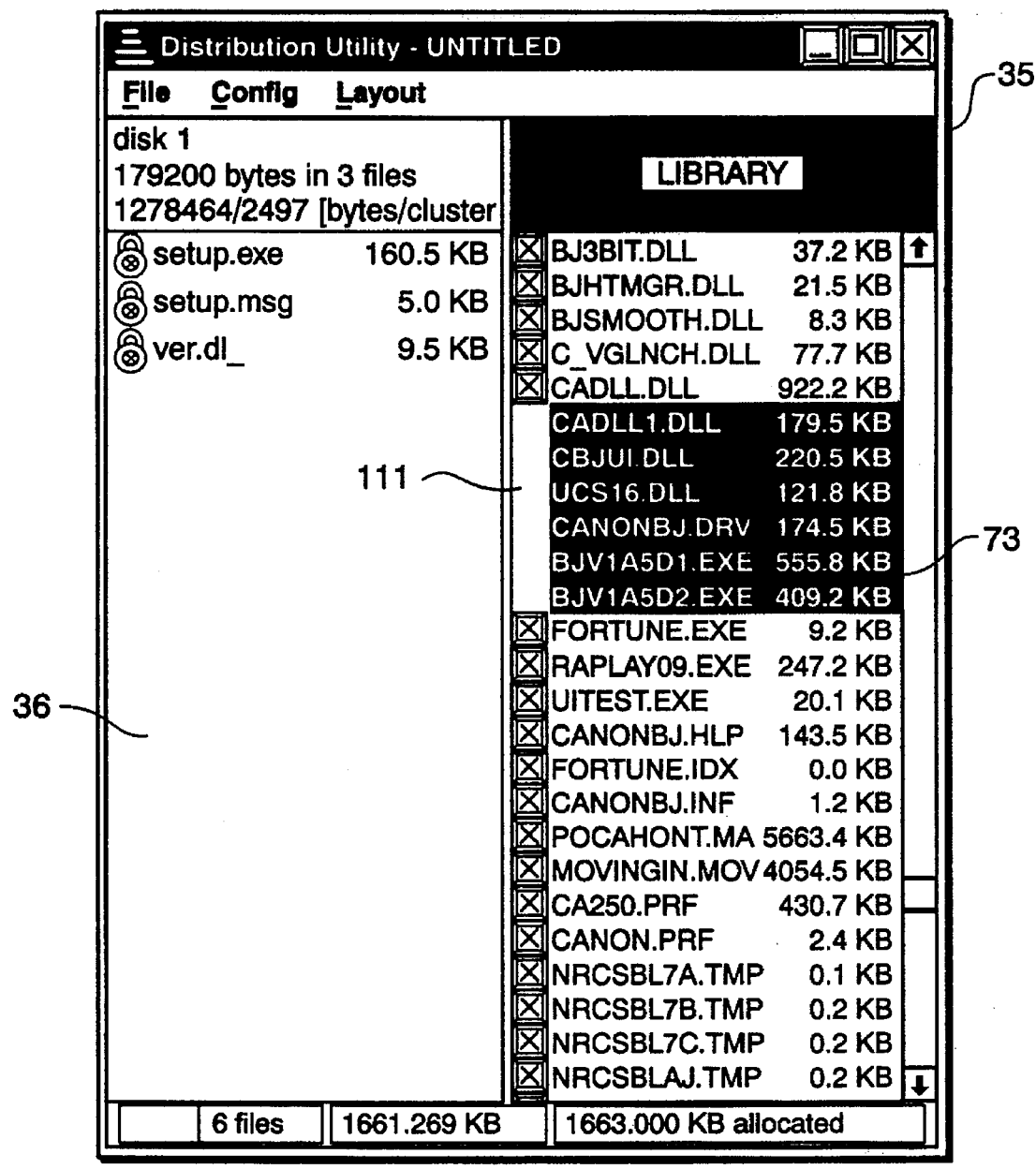
FIG. 22 shows selected files having defined attributes in an initial workspace generated by the present distribution diskette utility system.

As shown in FIG. 22, once file attributes dialog box 90 is closed, selected files 73 are displayed in distribution utility window 35 without corresponding indicator icons, as indicated by blank area 111. Blank area 111 indicates to the programmer that selected files 73 have been assigned file attributes, and that these files can be "dragged and dropped" to disk1 36, or distributed to other file storage designation areas via Suggest New Layout option 137, shown in FIG. 21.

Following step S2012, processing proceeds to step S313 in FIG. 3.

In step S313, the programmer can add additional file storage designation areas to distribution utility window 35. If, in step S313, the programmer does not wish DDU 5 to add additional file storage designation areas to distribution utility window 35, processing proceeds to step S314. If, however, additional file storage designation areas are to be added to distribution utility window 35, processing proceeds to flow diagram "H", shown in FIG. 23 and described in connection with FIG. 24.

In step S2301, the programmer clicks on Layout option 132 to display pull-down menu 152, and by clicking on Add Diskette option 136, DDU 5 adds another file storage designation area, disk2 112, to distribution utility window 35. Disk2 112 is identical to disk1 36 in all respects, i.e., memory space available is based on previously set distribution media size, etc., except that disk2 112 includes no locked setup files at its initial creation.

Figure 23:
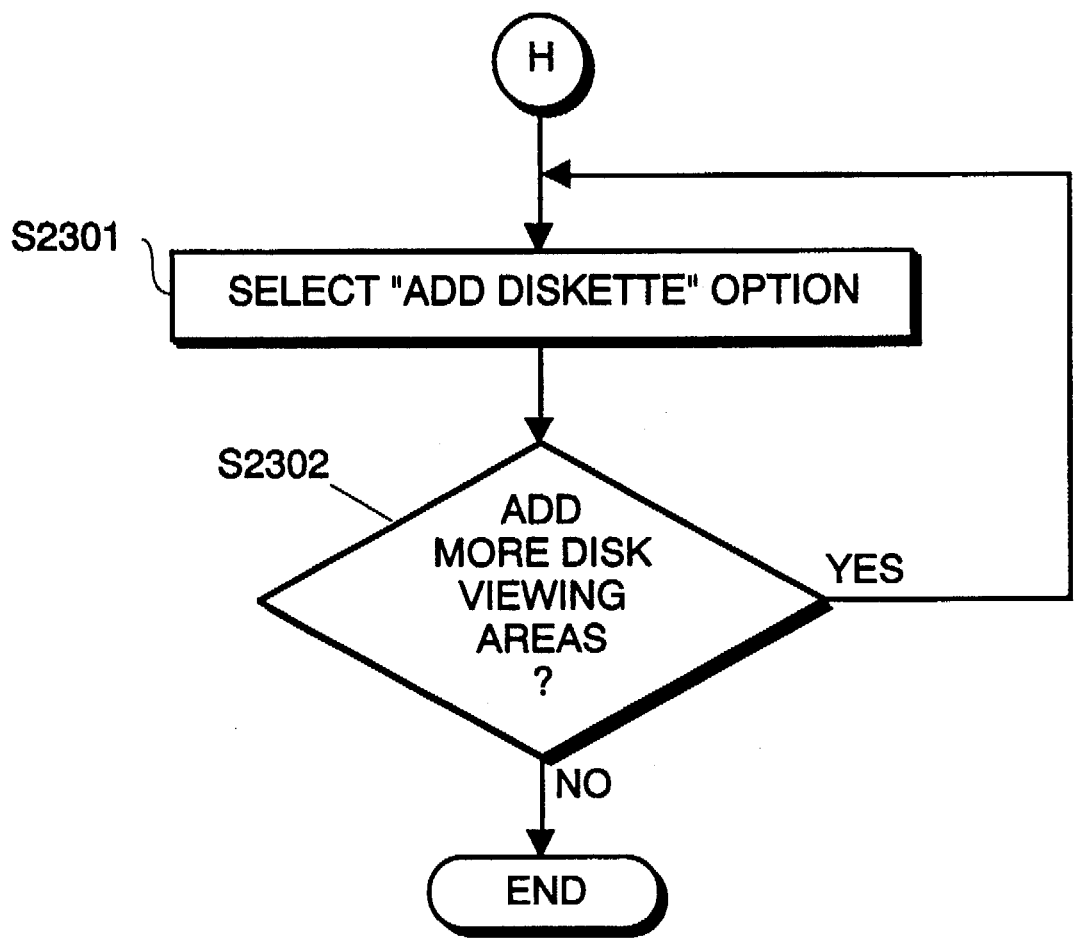
FIG. 23 is a flow diagram showing process steps for adding additional file storage designation areas to the workspace of FIG. 16.
Figure 24:
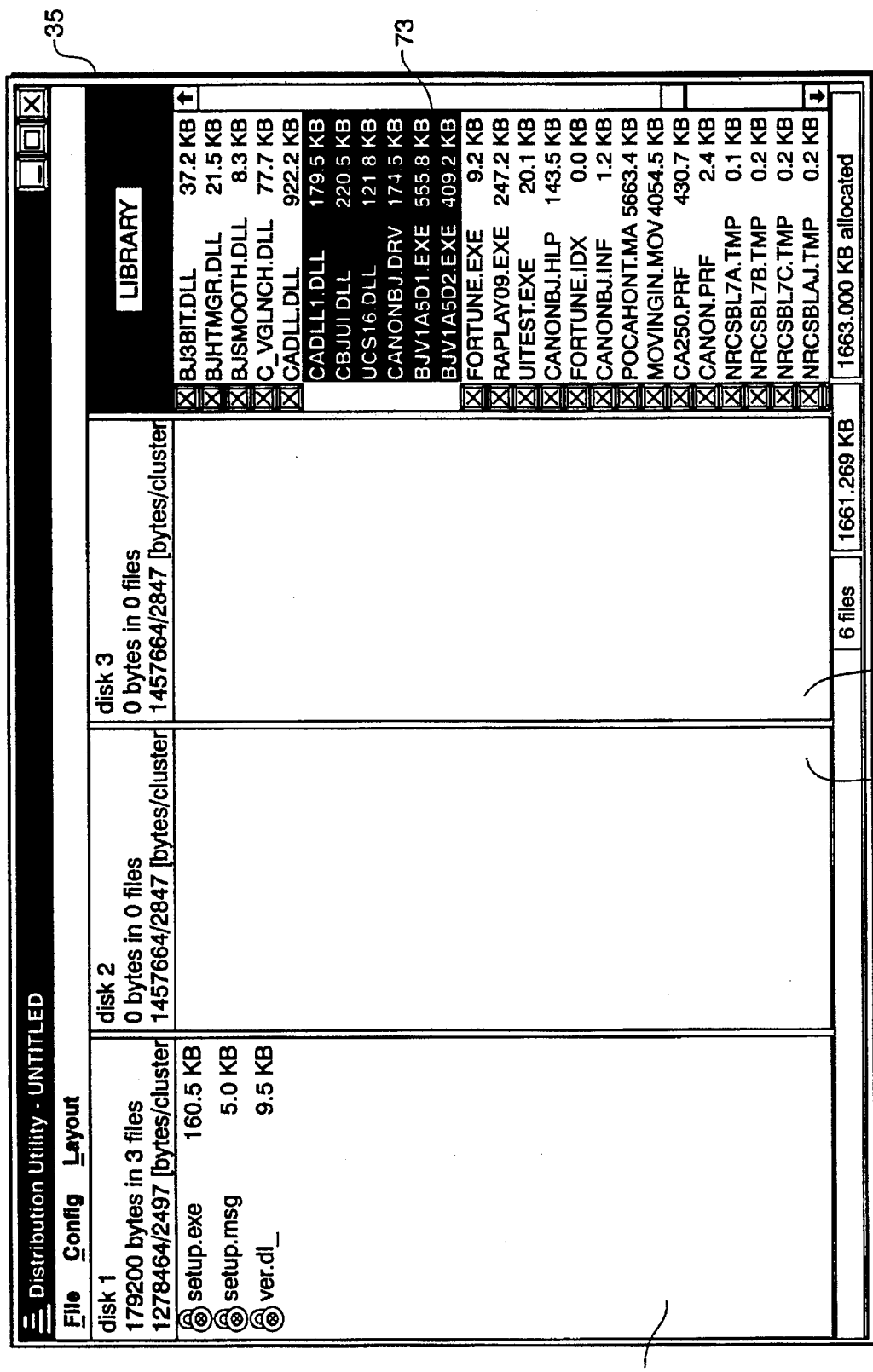
FIG. 24 shows the workspace of FIG. 16 with two additional file storage designation areas added thereto.

Following step S2301, processing proceeds to S2302, where the programmer can have DDU 5 add additional file storage designation areas to distribution utility window 35, if desired. If the programmer does not wish additional file storage designation areas to be added, processing ends, as shown in FIG. 23. However, if additional file storage designation areas are to be added, processing returns to step S2301. In the example shown in FIG. 24, disk3 113, identical in all respects to disk2 112, is also added to distribution utility window 35 by DDU 5.

Once the desired number of file storage designation areas, in this case three (3), have been added to distribution utility window 35, processing proceeds to step S314 in FIG. 3.

Figure 25:
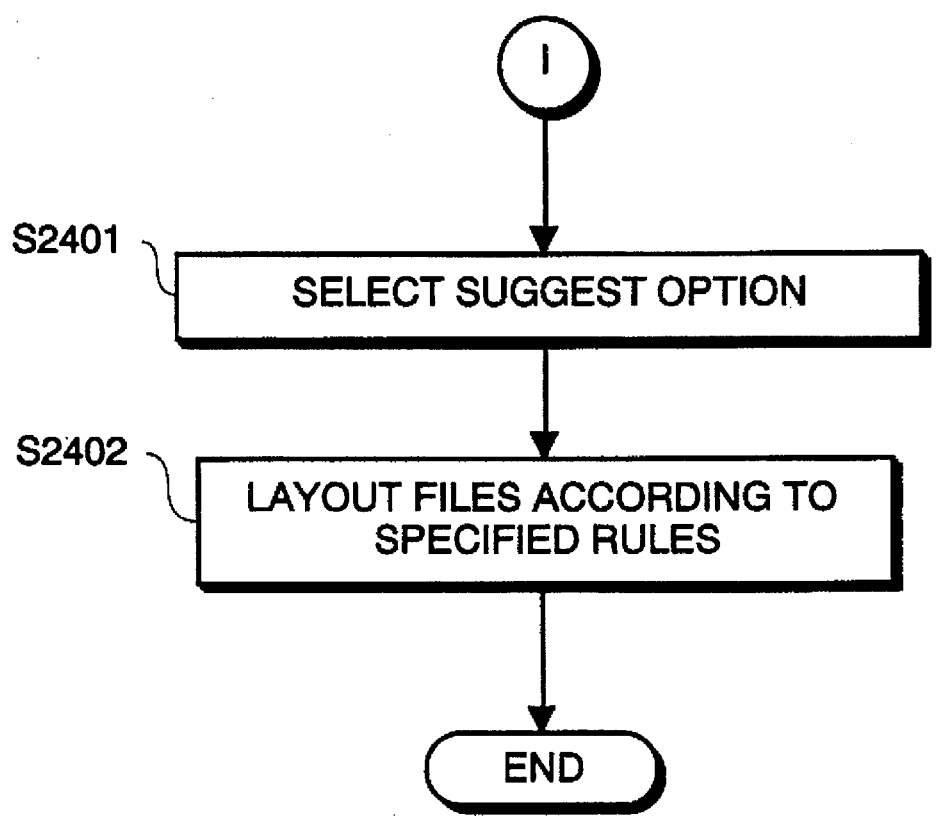
FIG. 25 is a flow diagram showing process steps for requesting a suggested file assignment from the present distribution diskette utility system.

In step S314, the programmer can select an option to have DDU 5 provide a suggested file distribution assignment, into file storage designation areas, of all files which have been assigned file attributes. If, in step S314, the programmer does not want a suggested file distribution assignment of all files having assigned file attributes, processing proceeds to step S315. If, however, the programmer wants DDU 5 to provide a suggested distribution assignment of all files having assigned file attributes, processing proceeds to flow diagram "T", shown in FIG. 25 and described in connection with FIG. 26.

In step S2401, the programer clicks on Layout option 132 to display pull-down menu 152, shown in FIG. 21, and on Suggest New Layout option 137, whereafter DDU 5 suggests an assignment of all files having assigned file attributes, according to a specified list of rules. These rules, are listed as follows, in order of priority: (1) all files previously locked in a particular file storage designation area, e.g., setup files, will remain in that file storage designation area; (2) the fewest number of file storage designation areas possible will be used; (3) minimize the number of file storage designation area switches for the end-user when the end-user runs SETUP program 6; (4) files that have been identified as Windows® System files are listed in the first file storage designation area as much as possible; (5) each computer-usable storage medium should have roughly the same amount of free space, i.e., spread the files across the file storage designation areas as evenly as possible; and (6) bitmaps to be used by SETUP program 6 will not be placed in a particular file storage designation area, but rather will be left in library 37.

When suggesting a file distribution assignment, DDU 5 adds or deletes file storage designation areas. For example, DDU 5 adds files storage designation areas as necessary, and deletes unnecessary file storage designation areas.

However, DDU 5 will not delete unnecessary file storage designation areas in the case that a particular file has been previously locked into a particular file storage designation area. In such a case, DDU 5 will not delete that file storage designation area, or any previous file storage designation areas having no files listed therein. For example, if a file is locked in disk3 113, DDU 5 will not delete disk3 113 when providing a suggested file distribution assignment. Nor will DDU 5 delete disk2 112, even if no files are listed in disk2 112.

It is noted that, when providing a suggested file distribution assignment, DDU 5 may reassign files which have been previously assigned to file storage designation areas and which are not locked in those file storage designation areas. For example, in the case that a programmer selectively assigns a file from library 37 to disk1 36 by "dragging and dropping", as described below, and then clicks on Suggest New Layout option 137, DDU 5, in providing a suggested distribution assignment, may reassign that file to disk 2 112 or to disk 3 113 in accordance with the foregoing rules.

Figure 26:
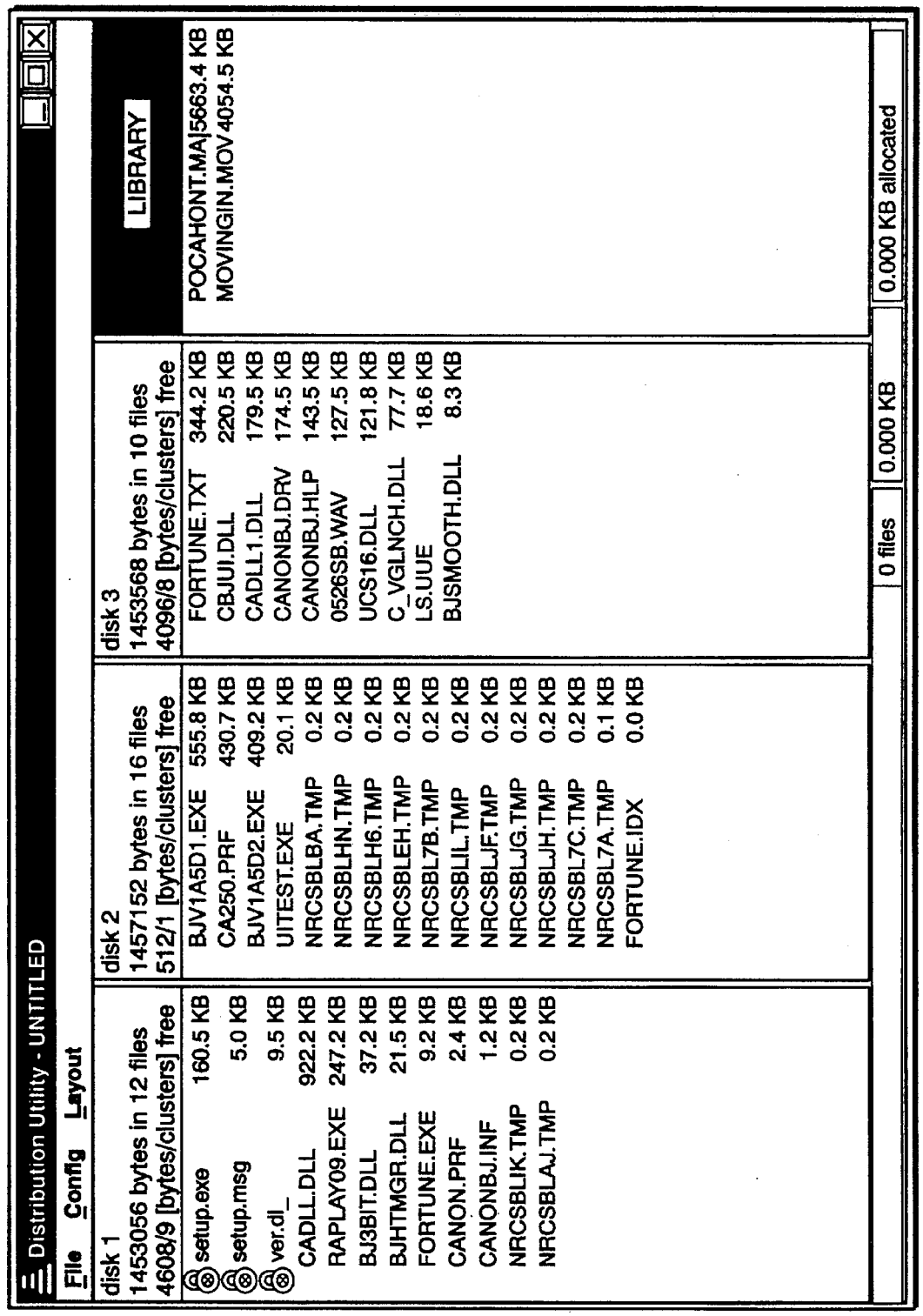
FIG. 26 shows a suggested assignment to file storage designation areas of all files in the library.

An example of a suggested assignment of all the files in library 37 is shown in FIG. 26. It is noted that two files were not placed in any file storage designation area because the distribution media size selected for disk1 36, disk2 112 and disk3 113 was not large enough to accommodate these files.

After the programmer requests a suggested distribution assignment, the programmer can selectively modify the suggested distribution assignment by "dragging and dropping" files, as described below in connection with step S315.

If, as indicated above, the programmer does not want a suggested distribution assignment from DDU 5, processing proceeds in accordance with the flow diagram shown in FIG. 3. More specifically, processing proceeds to step S315.

As stated previously, once a file has been assigned some attributes, the programmer can then distribute that particular file to a particular storage area. In step S315, the programmer selectively assigns the selected files by dragging one or more of the selected files from library 37 and dropping the one or more dragged files into one of the displayed file storage designation areas.

Figure 27:
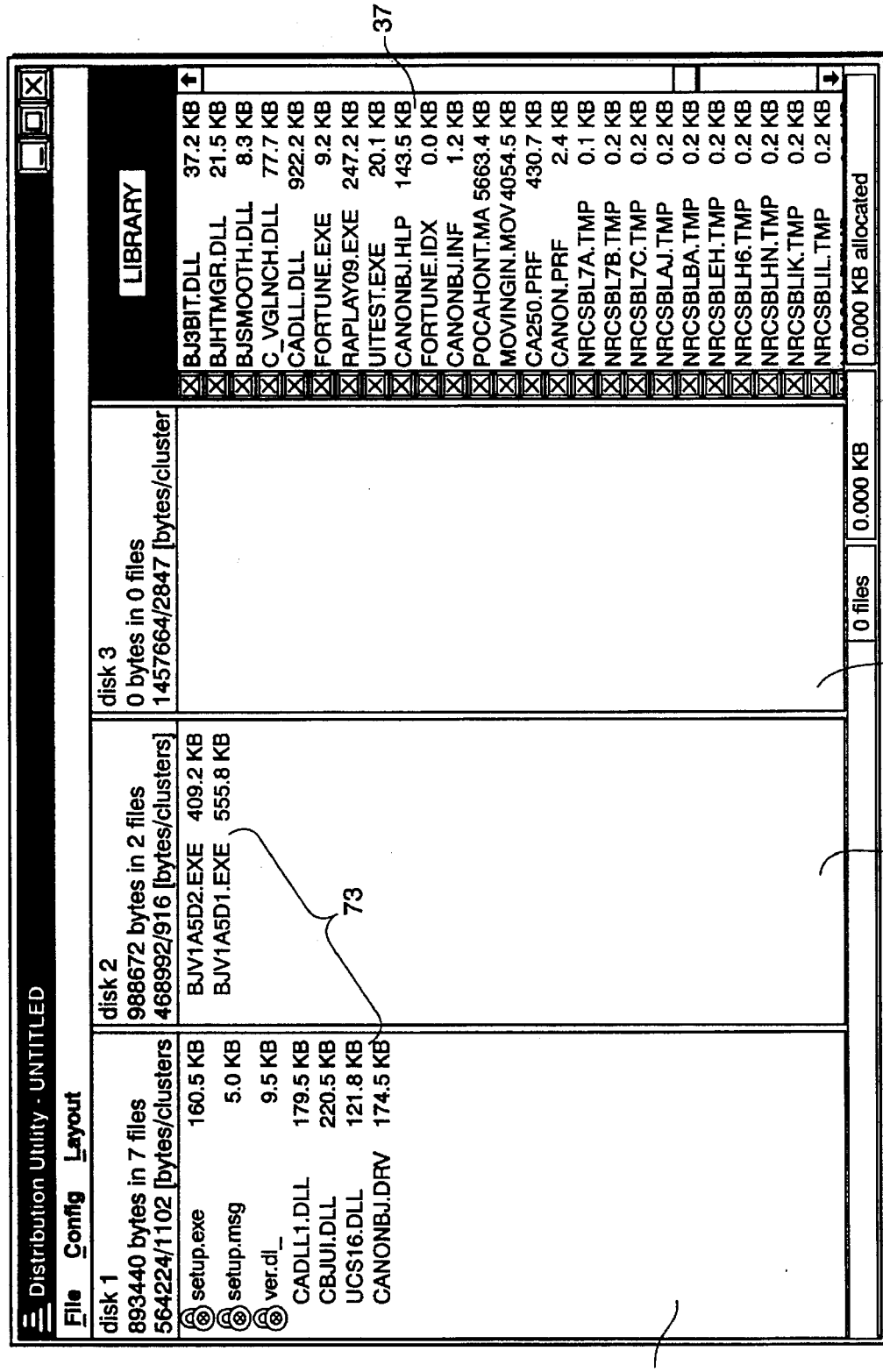
FIG. 27 shows the workspace of FIG. 24, in which the selected files have been selectively assigned by a programmer.

In the example shown in FIG. 27, four (4) of selected files 73 have been dragged from library 37 and dropped into disk1 36. In addition, two (2) of selected files 73 have been dragged from library 37 and dropped into disk2 112. None of selected files 73 have been dropped into disk3 113.

As indicated above, actual files are not dragged and dropped from library 37 into disk1 36, disk2 112 and disk3 113. Instead, only information relating to those files, such as file name, file size and file attributes, is dragged and dropped into disk1 36, disk2 112 and disk3 113.

Although the foregoing example describes dragging and dropping files from library 37 into various file storage designation areas, it is noted that files can also be dragged and dropped from one file storage designation area into another file storage designation area, e.g., from disk1 36 to disk3 113, except in the case where the files are locked in a particular file storage designation area, as described above.

Likewise, files can be reordered within a particular file storage designation area by dragging and dropping. For example, in the file distribution assignment shown in FIG. 27, CADLL1.DLL could be dragged and dropped to a position following CANONBJ.DRV. Since SETUP program 6 processes files sequentially, i.e., in the order that the files are distributed by DDU 5, this feature of DDU 5 provides a programmer with control over the order in which SETUP program 6 processes files.

In the case that the programmer attempts to drag and drop files into a file storage designation area which no longer has enough memory space to store the files, DDU 5 issues a warning message to the programmer. In the preferred embodiment of the present invention, this warning message comprises red highlighting on the file information screen corresponding to the file storage designation area into which the file has been added. For example, if a file is added to disk1 36 having a size which exceeds the storage space of disk1 36, in the preferred embodiment of the present invention, file information screen 38 would be highlighted in red.

Likewise, DDU 5 will also issue a warning message in the case that a file distribution assignment defined by a previously-created product file is no longer valid. For example, a file which was listed in disk1 36 in a previously-created product file may have changed in size such that the file is too large to fit into disk1 36. In this case, if the previously-created product file is opened, DDU 5 will issue a warning message.

Following selective distribution of selected files 73 in step S315, processing proceeds to step S316.

Once the programmer is satisfied with the distribution of the files comprising a component or an application, the programmer can instruct DDU 5 to build distribution subdirectories for displayed file storage designation areas and store files listed in the file storage designation areas in the subdirectories. Files can be copied from these distribution subdirectories onto computer-usable storage media, such as a floppy disk.

As indicated above, each distribution subdirectory stores files listed in its corresponding file storage designation area. In addition, however, the distribution subdirectory which stores the setup files also stores a list file (not shown) containing the names of all the files distributed by DDU 5 and corresponding attributes for those files. SETUP program 6 reads this list file, and based on the attributes specified therein, copies files listed therein from the distribution media to destinations, e.g., DFRD, on the end-user's system.

In order to build the distribution subdirectories, in step S317, the programmer clicks on Layout option 132 to display pull-down menu 152, shown in FIG. 21, and on Build Subdirectories option 138, whereafter DDU 5 builds subdirectories for each displayed file storage designation area. Thereafter, DDU 5 generates the list file, copies the list file to the subdirectory corresponding to the first file storage designation area, and copies actual files from the current working directory to the subdirectory corresponding to the file storage designation area in which the files were listed. In the present example, DDU 5 generates a list file for the files listed in disk1 36, disk2 112 and disk3 113. DDU 5 then builds a subdirectory for disk1 36, copies the list file to this subdirectory and copies files listed in disk1 36 from the current working directory to the this subdirectory. DDU 5 then builds a subdirectory for disk2 112 and copies files listed in disk2 112 from the current working directory to this subdirectory. The same is done for disk3 113.

It is noted that DDU 5 builds subdirectories for file storage designation areas, such as disk3 113, that contain no files. However, in such a case, DDU 5 issues a warning message to the programmer indicating that no files are contained in the file storage designation area. Likewise, DDU 5 issues a warning message if unassigned files, i.e., files having no assigned file attributes, remain in library 37.

In a preferred embodiment of the present invention, upon building a subdirectory for each file storage designation area, DDU 5 prompts the programmer to insert a distribution medium, such as a floppy disk. After the distribution medium is inserted, DDU 5 copies the files in the subdirectory to the distribution medium.

If, however, copying to a distribution medium by DDU 5 is not desired, the programmer can selectively copy files from the subdirectories onto distribution media after all of the subdirectories have been built.

If the programmer does not want DDU 5 to build distribution subdirectories, processing proceeds to step S318. In step S318, the programmer can save the current DDU workspace.

The programmer can save the current DDU workspace by clicking on File option 130 to display pull-down menu 148, and then clicking on Save option 150 if the current DDU workspace has been previously saved, or on Save As option 118 if the current DDU workspace has not been previously saved as a product file.

Figure 28:
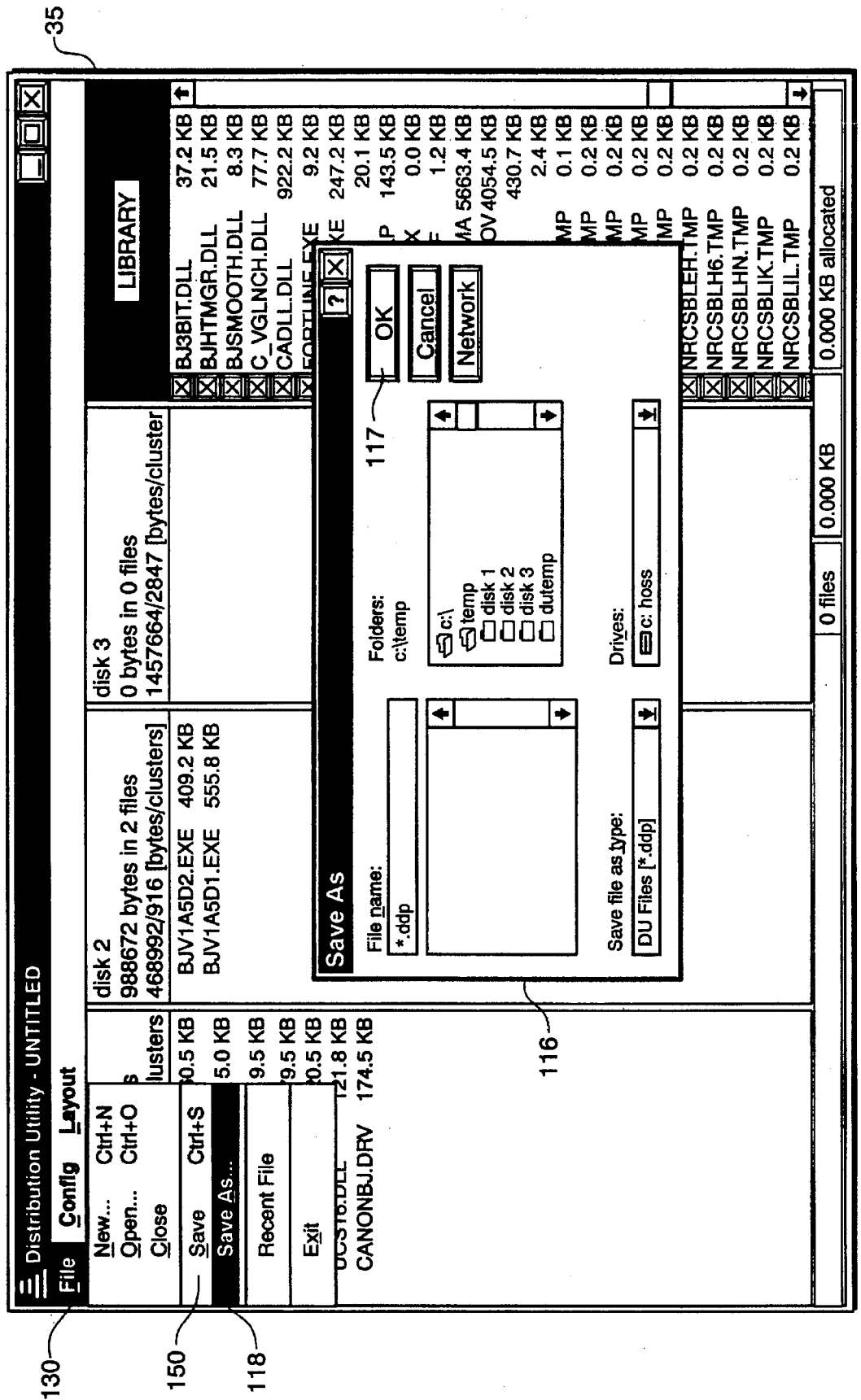
FIG. 28 shows a dialog box used to save new product files.

In the case that the Save As option 118 is selected, DDU 5 displays standard Windows® Save As dialog box 116, as shown in FIG. 28. Then, the programmer can enter a product file name, which is preferably a file name with a ".ddp" appendix, in the appropriate portion of Save As dialog box 116. Once the programmer confirms the save by clicking on OK button 117, DDU 5 creates a product file having the specified name. This product file contains the current DDU workspace, i.e., distribution utility window 35, along with all information associated therewith, such as files listed in library 37, current distribution of files in disk1 36, disk2 112 and disk3 113, etc. Thereafter, the programmer can go back and make any modifications to the DDU workspace, as described above.

If the programmer does not wish to have the current DDU workspace saved, the programmer can exit DDU 5 by clicking on File option 130 to display pull-down menu 148, and then clicking on Exit option 149. Alternatively, the programmer can select Close option 161 from pull-down menu 148 and elect not to save the current DDU workspace when prompted to do so.

The present invention has been described with respect to a particular illustrative embodiment. It is to be understood that the invention is not limited to the above-described embodiment and that various changes and modifications may be made by those of ordinary skill in the art without departing from the spirit and scope of the appended claims.

What is claimed is:

1. A method of distributing files onto a computer-usable storage medium based on a user's selection of at least one file from a file library comprising executable and nonexecutable files, the files being loadable from the computer-usable storage medium into directories on an end-user's system, said method comprising:

a first displaying step for displaying (1) the file library and (2) one or more file storage designation area(s), each having a corresponding predetermined size which is representative of a computer-usable storage medium;

a second displaying step for displaying, in response to a user's input which includes selection of one or more file(s) in the file library, a file attribute option which includes file installation options;

an assigning step for assigning, in response to a user's selection of a file installation option, one or more file attribute(s) to each selected file, the one or more file attribute(s) specifying a target directory on the end-user's system into which the selected file(s) is/are to be stored;

a third displaying step for displaying the selected file(s) in one or more file storage designation area(s) in response to a user's dragging and dropping the selected file(s) into the one or more file storage designation area(s); and a storing step for storing all files in each file storage designation area, together with their file attributes, into a corresponding computer-usable storage medium.

2. A method according to claim 1, wherein said first displaying step comprises automatically displaying a first file storage designation area, and displaying, in response to a user's input, additional file storage designation areas.

3. A method according to claim 2, wherein the first file storage designation area contains a plurality of setup files when the first file storage designation area is displayed.

4. A method according to claim 3, wherein the plurality of setup files contained in the first file storage designation area are locked in the first file storage designation area so as to prevent the plurality of setup files from being moved out of the first file storage designation area.

5. A method according to claim 1, wherein each file storage designation area includes a file information viewing screen for viewing information relating to files displayed in a file storage designation area; and wherein the file information viewing screen displays a warning message when files having a file size greater than a predetermined file size are assigned to the file storage designation area.

6. A method according to claim 1, wherein the file library includes a file data line for viewing information relating to files displayed in the file library.

7. A method according to claim 1, wherein said method is performed by a means for distributing files onto a computer-usable storage medium, and further comprising:

a selecting step for selecting, in response to a user's input and prior to said first displaying step, one of a plurality of configuration options for the means for distributing files onto a computer-usable storage medium.

8. A method according to claim 7, wherein the plurality of configuration options includes an option to select a distribution media size for the one or more file storage designation area(s).

9. A method according to claim 7, wherein the plurality of configuration options includes an option to specify a data file root directory into which files installed on a computer-usable storage medium according to said method of distributing files onto a computer-usable storage medium are installed.

10. A method according to claim 7, wherein the plurality of configuration options includes an option to define a setup title for files installed on a computer-usable storage medium according to said method of distributing files onto a computer-usable storage medium.

11. A method according to claim 7, wherein the plurality of configuration options includes an option to define a program manager group into which files installed on a computer-usable storage medium according to said method of distributing files onto a computer-usable storage medium are installed.

12. A method according to claim 7, wherein the plurality of configuration options includes an option define at least one component, and wherein, in the case that a user defines at least one component, the at least one component comprises a file attribute option which is displayed in said second displaying step.

13. A method according to claim 1, wherein said first displaying step comprises displaying indicator icons that correspond to files in the file library, and wherein the indicator icons are removed when the one or more file attribute(s) is/are assigned to the selected file.

14. A system for distributing files onto a computer-usable storage medium based on a user's selection of at least one file from a file library comprising executable and nonexecutable files, the file(s) being loadable from the computer-usable storage medium into directories on an end-user's system, said system comprising:

input means for inputting user selections and processing commands;

memory means for storing the file library, a file distribution application, and process steps; and processing means for processing, in response to a processing command, the stored process steps so as to execute the file distribution application, wherein upon executing the file distribution application, said processing means performs (1) a first displaying step for displaying the file library and one or more file storage designation area(s), each having a corresponding predetermined size which is representative of a computer-usable storage medium, (2) a second displaying step for displaying, in response to a user's input which includes selection of one or more file(s) in the file library, a file attribute option which includes file installation options, (3) an assigning step for assigning, in response to a user's selection of a file installation option, one or more file attribute(s) to each selected file, the one or more file attribute(s) specifying a target directory on the end-user's system into which the selected file(s) is/are to be stored, (4) a third displaying step for displaying the selected file(s) in one or more file storage designation area(s) in response to a user's dragging and dropping the selected file(s) into the one or more file storage designation area(s), and (5) a storing step for storing all files in each file storage designation area, together with their file attributes, into a corresponding computer-usable storage medium.

15. A system according to claim 14, wherein said processor displays a first file storage designation area in the first displaying step, and wherein said processor displays additional files storage designation areas in response to a user's input.

16. A system according to claim 15, wherein the first file storage designation area contains a plurality of setup files when the first file storage designation area is displayed.

17. A system according to claim 16, wherein the plurality of setup files contained in the first file storage designation area are locked in the first file storage designation area so as to prevent the plurality of setup files from being moved out of the first file storage designation area.

18. A system according to claim 14, wherein each file storage designation area includes a file information viewing screen for viewing information relating to files displayed in a file storage designation area; and wherein the file information viewing screen displays a warning message when files having a file size greater than a predetermined file size are assigned to the file storage designation area.

19. A system according to claim 14, wherein the file library includes a file data line for viewing information relating to files displayed in the file library.

20. A system according to claim 14, wherein said processor performs a selecting step for selecting, in response to a user's input and prior to the first displaying step, one of a plurality of configuration options for the system for distributing files onto a computer-usable storage medium.

21. A system according to claim 20, wherein the plurality of configuration options includes an option to select a distribution media size for the one or more file storage designation area(s).

22. A system according to claim 20, wherein the plurality of configuration options includes an option to specify a data file root directory into which files installed on a computer-usable storage medium by said system for distributing files onto a computer-usable storage medium are installed.

23. A system according to claim 20, wherein the plurality of configuration options includes an option to define a setup title for files installed on a computer-usable storage medium by said system for distributing files onto a computer-usable storage medium.

24. A system according to claim 20, wherein the plurality of configuration options includes an option to define a program manager group into which files installed on a computer-usable storage medium by said system for distributing files onto a computer-usable storage medium are installed.

25. A system according to claim 20, wherein the plurality of configuration options includes an option to defines at least one component, and wherein, in the case that a user defines at least one component, the at least one component comprises a file attribute option which is displayed by said processing means in the second displaying step.

26. A system according to claim 14, wherein the first displaying step performed by said processor comprises displaying indicator icons that correspond to files in the file library, and wherein the indicator icons are removed when the one or more file attribute(s) is/are assigned to the selected file.

27. A method of distributing files having assigned attributes onto computer-usable storage media based on a suggested file distribution, the files being loadable from the computer-usable storage media into directories on an end-user's system, said method comprising:

a first displaying step for displaying (1) a file library comprising executable and nonexecutable files and (2) one or more file storage designation area(s) corresponding to fixed storage area(s) in a memory means;

a second displaying step for displaying, in response to a user's input which includes selection of one or more file(s) in the file library, a file attribute option which includes file installation options;

an assigning step for assigning, in response to a user's selection of a file installation option, one or more file attribute(s) to a selected file, the one or more file attribute(s) specifying a target directory on the end-user's system into which selected files are to be stored;

a third displaying step for displaying, in response to a user's input, a suggested file distribution assignment of the selected file to one file storage designation area; and a storing step for storing, in response to a user's input, the selected file in a fixed storage area corresponding to the one file storage designation area, and for storing the selected file from the fixed storage area onto a computer-usable storage medium.

28. A method according to claim 27, wherein at least one of the executable and nonexecutable files comprising the file library has pre-assigned file attributes;

wherein said third displaying step includes displaying, in response to the user's input, a suggested file distribution assignment of the at least one of the executable and nonexectuable files to one file storage designation area; and wherein said storing step includes storing, in response to the user's input, the at least one of the executable and nonexecutable files in a fixed storage area in the memory means.

29. A method according to claim 27, further comprising:

a fourth displaying step, between said third displaying step and said storing step, for displaying the selected file in another file storage designation area in response to a user's dragging and dropping the selected file from the one file storage designation area into the another file storage designation area.

30. A method according to claim 27, wherein a suggested file distribution assignment of selected files is based on a plurality of rules of priority.

31. A system for distributing files having assigned attributes onto computer-usable storage media based on a suggested file distribution, the files being loadable from the computer-usable storage media into directories on an end-user's system, said system comprising:

input means for inputting user selections and processing commands;

memory means for storing a file library comprising executable and nonexecutable files, a file distribution application, and process steps; and processing means for processing, in response to a processing command, the stored process steps so as to execute the file distribution application, wherein upon executing the file distribution application, said processing means performs (1) a first displaying step for displaying a file library comprising executable and nonexecutable files and one or more file storage designation area(s) corresponding to fixed storage area(s) in said memory means, (2) a second displaying step for displaying, in response to a user's input which includes selection of one or more file(s) in the file library, a file attribute option which includes file installation options, (3) an assigning step for assigning, in response to a user's selection of a file installation option, one or more file attribute(s) to a selected file, the one or more file attribute(s) specifying a target directory on the end-user's system into which selected files are to be stored, (4) a third displaying step for displaying, in response to a user's input, a suggested file distribution assignment of the selected file to one file storage designation area, and (5) a storing step for storing, in response to a user's input, the selected file in fixed storage area corresponding to the one file storage designation area, and for storing the selected file from the fixed storage area onto a computer-usable storage medium.

32. A system according to claim 31, wherein at least one of the executable and nonexecutable files comprising the file library has pre-assigned file attributes;

wherein said processor, in the third displaying step, displays, in response to the user's input, a suggested distribution assignment of the at least one of the executable and nonexectuable files to one file storage designation area; and wherein said processor, in the storing step, stores, in response to the user's input, the at least one of the executable and nonexecutable files in a fixed storage area in said memory means.

33. A system according to claim 31, wherein said processor performs a fourth displaying step, between the third displaying step and the storing step, for displaying the selected file in another file storage designation area in response to a user's dragging and dropping the selected file from the one file storage designation area into the another file storage designation area.

34. A system according to claim 31, wherein the suggested file distribution assignment of the selected files is based on a plurality of rules of priority.

35. Computer-executable process steps stored on a computer-readable medium, said process steps for distributing files onto a computer-usable storage medium based on a user's selection of at least one file from a file library comprising executable and nonexecutable files, the files being loadable from the computer-usable storage medium into directories on an end-user's system, said process steps comprising:

a first displaying step which displays (1) the file library and (2) one or more file storage designation area(s), each having a corresponding predetermined size which is representative of a computer-usable storage medium;

a second displaying step which displays, in response to a user's input which includes selection of one or more file(s) in the file library, a file attribute option which includes file installation options;

an assigning step which assigns, in response to a user's selection of a file installation option, one or more file attribute(s) to each selected file, the one or more file attribute(s) specifying a target directory on an end-user's system into which the selected file(s) is/are to be stored;

a third displaying step which displays the selected file(s) in one or more file storage designation area(s) in response to a user's dragging and dropping the selected file(s) into the one or more file storage designation area(s); and a storing step which stores all files in each file storage designation area, together with their file attributes, into a corresponding computer-usable storage medium.

36. Computer-executable process steps according to claim 35, wherein said first displaying step comprises automatically displaying a first file storage designation area, and displaying, in response to a user's input, additional file storage designation areas.

37. Computer-executable process steps according to claim 36, wherein the first file storage designation area contains a plurality of setup files when the first file storage designation area is displayed.

38. Computer-executable process steps according to claim 37, wherein the plurality of setup files contained in the first file storage designation area are locked in the first file storage designation area so as to prevent the plurality of setup files from being moved out of the first file storage designation area.

39. Computer-executable process steps according to claim 35, wherein each file storage designation area includes a file information viewing screen for viewing information relating to files displayed in a file storage designation area; and wherein the file information viewing screen displays a warning message when files having a file size greater than a predetermined file size are assigned to the file storage designation area.

40. Computer-executable process steps according to claim 35, wherein the file library includes a file data line for viewing information relating to files displayed in the file library.

41. Computer-executable process steps according to claim 35 further comprising:

a selecting step which selects, in response to a user's input, one of a plurality of configuration options.

42. Computer-executable process steps according to claim 41, wherein the plurality of configuration options includes an option to select a distribution media size for the one or more file storage designation area(s).

43. Computer-executable process steps according to claim 41, wherein the plurality of configuration options includes an option to specify a data file root directory into which files installed on a computer-usable storage medium are installed.

44. Computer-executable process steps according to claim 41, wherein the plurality of configuration options includes an option to define a setup title for files installed on a computer-usable storage medium.

45. Computer-executable process steps according to claim 41, wherein the plurality of configuration options includes an option to define a program manager group into which files installed on a computer-usable storage medium are installed.

46. Computer-executable process steps according to claim 41, wherein the plurality of configuration options includes an option define at least one component, and wherein, in the case that a user defines at least one component, the at least one component comprises a file attribute option.

47. Computer-executable process steps according to claim 41, wherein said first displaying step comprises displaying indicator icons that correspond to files in the file library, and wherein the indicator icons are removed when the one or more file attribute(s) is/are assigned to the selected file.

48. Computer-executable process steps stored on a computer-readable medium, said process steps for distributing files having assigned attributes onto computer-usable storage media based on a suggested file distribution, the files being loadable from the computer-usable storage media into directories on an end-user's system, said process steps comprising:

a first displaying step which displays (1) a file library comprising executable and nonexecutable files and (2) one or more file storage designation area(s) corresponding to fixed storage area(s) in a memory means;

a second displaying step which displays, in response to a user's input which includes selection of one or more file(s) in the file library, a file attribute option which includes file installation options;

an assigning step which assigns, in response to a user's selection of a file installation option, one or more file attribute(s) to a selected file, the one or more file attribute(s) specifying a target directory on the end-user's system into which selected files are to be stored;

a third displaying step which displays, in response to a user's input, a suggested file distribution assignment of the selected file to one file storage designation area; and a storing step which stores, in response to a user's input, the selected file in a fixed storage area corresponding to the one file storage designation area, and which stores the selected file from the fixed storage area onto a computer-usable storage medium.

49. Computer-executable process steps according to claim 48, wherein at least one of the executable and nonexecutable files comprising the file library has pre-assigned file attributes;

wherein said third displaying step includes displaying, in response to the user's input, a suggested file distribution assignment of the at least one of the executable and nonexecutable files to one file storage designation area; and wherein said storing step includes storing, in response to the user's input, the at least one of the executable and nonexecutable files in a fixed storage area in the memory means.

50. Computer-executable process steps according to claim 48, further comprising:

a fourth displaying step, between said third displaying step and said storing step, which displays the selected file in another file storage designation area in response to a user's dragging and dropping the selected file from the one file storage designation area into the another file storage designation area.

51. Computer-executable process steps according to claim 48, wherein the suggested file distribution assignment of the selected files is based on a plurality of rules of priority.

52. A computer program product comprising:

a computer-usable medium having a computer-readable program code means embodied in said computer-usable medium for causing a file distribution application to be launched within an operating windowing application comprising:

a computer-readable program code means for causing a computer to launch the file distribution application upon an input execution command; and a computer-readable program code means for causing a computer to execute the file distribution application so as to distribute files onto a computer-usable storage medium based on a user's selection of at least one file from a file library comprising executable and nonexecutable files, the files being loadable from the computer-usable storage medium into directories on an end-user's system, the file distribution application comprising (1) a first displaying step for displaying the file library and one or more file storage designation area(s), each having a corresponding predetermined size which is representative of a computer-usable storage medium, (2) a second displaying step for displaying, in response to a user's input which includes selection of one or more file(s) in the file library, a file attribute option which includes file installation options, (3) an assigning step for assigning, in response to a user's selection of a file installation option, one or more file attribute(s) to each selected file, the one or more file attribute(s) specifying a target directory on the end-user's system into which the selected file(s) is/are to be stored, (4) a third displaying step for displaying the selected file(s) in one or more file storage designation area(s) in response to a user's dragging and dropping the selected file(s) into the one or more file storage designation area(s), and (5) a storing step for storing all files in each file storage designation area, together with their file attributes, into a corresponding computer-usable storage medium.

53. A computer program product comprising:

a computer-usable medium having a computer-readable program code means embodied in said computer-usable medium for causing a file distribution application to be launched within an operating windowing application comprising:

a computer-readable program code means for causing a computer to launch the file distribution application upon an input execution command; and a computer-readable program code means for causing a computer to execute the file distribution application so as to distribute files having assigned attributes onto computer-usable storage media based on a suggested file distribution, the files being loadable from the computer-usable storage media into directories in an end-user's system, the file distribution application comprising (1) a first displaying step for displaying a file library comprising executable and nonexecutable files and one or more file storage designation area(s) corresponding to fixed storage area(s) in a memory means, (2) a second displaying step for displaying, in response to a user's input which includes selection of one or more file(s) in the file library, a file attribute option which includes file installation options, (3) an assigning step for assigning, in response to a user's selection of a file installation option, one or more file attribute(s) to a selected file, the one or more file attribute(s) specifying a target directory on the enduser's system into which selected files is/are to be stored, (4) a third displaying step for displaying, in response to a user's input, a suggested file distribution assignment of the selected file to one file storage designation area, and (5) a storing step for storing, in response to a user's input, the selected file in a fixed storage area corresponding to the one file storage designation area, and for storing the selected file from the fixed storage area onto a computer-usable storage medium.

54. An apparatus which distributes files onto a computer-usable storage medium based on a user's selection of at least one file from a file library comprising executable and nonexecutable files, the files being loadable from the computer-usable storage medium into directories on an end-user's system, said apparatus comprising:

a pointing device which inputs user selections and processing commands;

a memory which stores the file library, a file distribution application, and process steps; and a processor which processes, in response to a processing command, the stored process steps so as to execute the file distribution application, wherein upon executing the file distribution application, said processor performs (1) a first displaying step for displaying the file library and one or more file storage designation area(s), each having a corresponding predetermined size which is representative of a computer-usable storage medium, (2) a second displaying step for displaying, in response to a user's input which includes selection of one or more file(s) in the file library, a file attribute option which includes file installation options, (3) an assigning step for assigning, in response to a user's selection of a file installation option, one or more file attribute(s) to each selected file, the one or more file attribute(s) specifying a target directory on the end-user's system into which the selected files are to be stored, (4) a third displaying step for displaying the selected file(s) in one or more file storage designation area(s) in response to a user's dragging and dropping the selected file(s) into the one or more file storage designation area(s), and (5) a storing step for storing all files in each file storage designation area, together with their file attributes, into a corresponding computer-usable storage medium.

55. An apparatus which distributes files having assigned attributes onto computer-usable storage media based on a suggested file distribution, the files being loadable from the computer-usable storage media into directories on an end-user's system, said apparatus comprising:

a pointing device which inputs user selections and processing commands;

a memory which stores a file library comprising executable and nonexecutable files, a file distribution application, and process steps; and a processor which processes, in response to a processing command, the stored process steps so as to execute the file distribution application, wherein upon executing the file distribution application, said processor performs (1) a first displaying step for displaying a file library comprising executable and nonexecutable files and one or more file storage designation area(s) corresponding to fixed storage area(s) in said memory, (2) a second displaying step for displaying, in response to a user's input which includes selection of one or more file(s) in the file library, a file attribute option which includes file installation options, (3) an assigning step for assigning, in response to a user's selection of a file installation option, one or more file attribute(s) to a selected file, the one or more file attribute(s) specifying a target directory on the end-user's system into which selected files are to be stored, (4) a third displaying step for displaying, in response to a user's input, a suggested file distribution assignment of the selected file to one file storage designation area, and (5) a storing step for storing, in response to a user's input, the selected file in a fixed storage area corresponding to the one file storage designation area, and for storing the selected file from the fixed storage area onto a computer-usable storage medium.

* * * * *